(12) United States Patent
Kaine

(10) Patent No.: US 11,393,428 B2
(45) Date of Patent: *Jul. 19, 2022

(54) METHOD AND SYSTEM OF WIRELESS DATA TRANSMISSION FOR VIRTUAL OR AUGMENTED REALITY HEAD MOUNTED DISPLAYS

(71) Applicant: Intel Corporation, Santa Clara, CA (US)

(72) Inventor: Greg D. Kaine, Cypress, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/925,180

(22) Filed: Jul. 9, 2020

(65) Prior Publication Data

US 2020/0342830 A1  Oct. 29, 2020

Related U.S. Application Data

(63) Continuation of application No. 15/658,295, filed on Jul. 24, 2017, now Pat. No. 10,720,125.

(51) Int. Cl.
*G09G 5/12* (2006.01)
*G09G 5/00* (2006.01)
*H04W 84/12* (2009.01)

(52) U.S. Cl.
CPC ............. *G09G 5/006* (2013.01); *G09G 5/005* (2013.01); *G09G 5/12* (2013.01); *G09G 2354/00* (2013.01); *G09G 2370/16* (2013.01); *H04W 84/12* (2013.01)

(58) Field of Classification Search
None
See application file for complete search history.

(56) References Cited

U.S. PATENT DOCUMENTS

2019/0379428 A1 * 12/2019 Lucas ............... H04M 1/72454

* cited by examiner

*Primary Examiner* — Amr A Awad
*Assistant Examiner* — Donna V Bocar
(74) *Attorney, Agent, or Firm* — Essential Patents Group, LLP.

(57) ABSTRACT

A system, article, and method of wireless data transmission for virtual or augmented reality head mounted displays.

25 Claims, 10 Drawing Sheets

FIG. 1

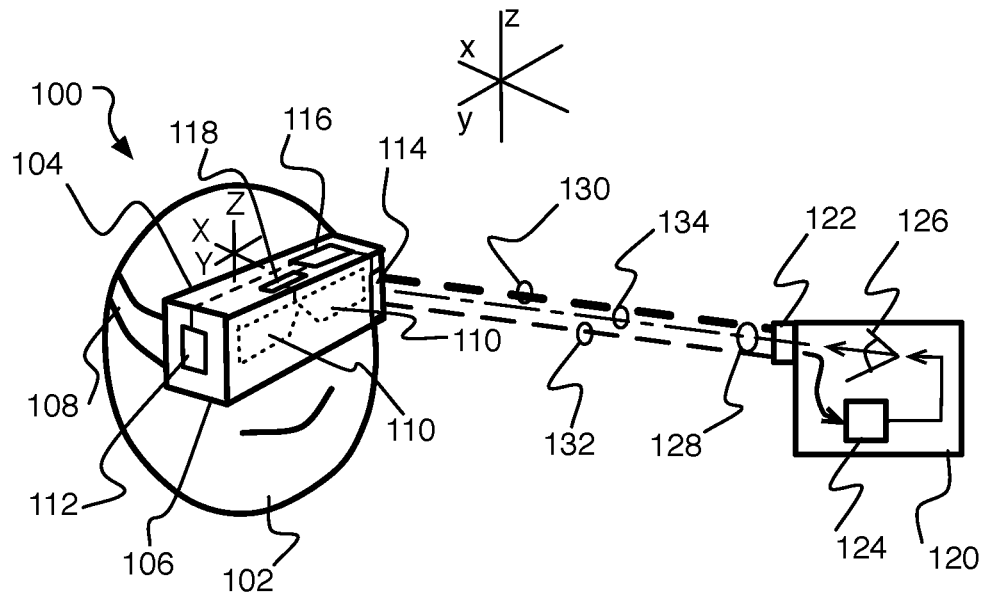

FIG. 3 300

| SENSING A 3D POSITION OF AT LEAST ONE HEAD MOUNTED DISPLAY (HMD) ARRANGED TO DISPLAY VIDEO SEQUENCES TO A PERSON 302 |
|---|

↓

| DETERMINING THE LOCATION OF THE SENSED 3D HMD POSITION RELATIVE TO A BASE 304 |
|---|

↓

| WHEREIN THE SENSING AND DETERMINING IS PERFORMED WITH OTHER THAN A RADIO-BASED SEARCH 306 |
|---|

↓

| DETERMINE A BEAM POSITION OF A WIRELESS RADIO-BASED TRANSMISSION BEAM BY USING THE 3D HMD POSITION 308 |
|---|

↓

| WIRELESSLY TRANSMIT IMAGES FROM THE BASE AND DIRECTED TO THE HMD ALONG THE BEAM TO DISPLAY THE IMAGES TO THE PERSON AT THE HMD 310 |
|---|

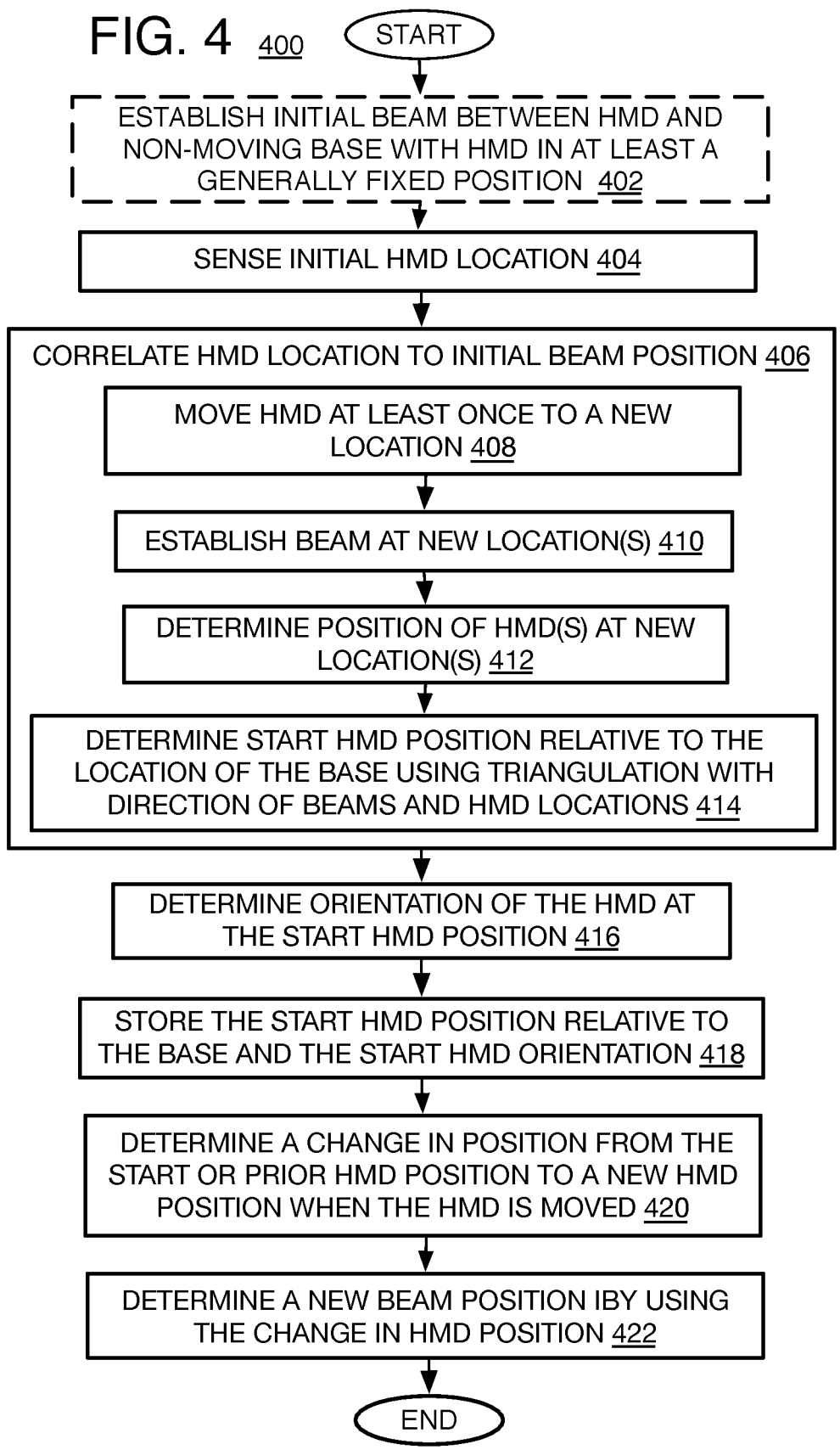

METHOD AND SYSTEM OF WIRELESS DATA TRANSMISSION FOR VIRTUAL OR AUGMENTED REALITY HEAD MOUNTED DISPLAYS

CLAIM FOR PRIORITY

This application is a continuation of U.S. patent application Ser. No. 15/658,295, filed on Jul. 24, 2017, titled "Method and System of Wireless Data Transmission for Virtual or Augmented Reality Head Mounted Displays", and which is incorporated herein by reference in entirety for all purposes.

BACKGROUND

Head mounted displays (HMDs) are worn over the eyes and present images to a user wearing the HMD to provide the user a point of view (POV) in a virtual or augmented reality (or world). The HMD is conventionally connected by one or more wires to an image processing base, such as a game console, computer, or dock. In order to provide real-time images on the HMD, sensors on the HMD transmit data indicating the 3D location and orientation of the HMD to the image processing device or base, and the base then transmits the image to the HMD over the wires. Due to the constant motion of the HMD, the location and orientation of the HMD must be updated constantly with new images so that the images displayed on the HMD match the motion of the HMD in near real-time so that the user feels as if they are in the virtual or augmented world. This requires a very large amount of computations usually limiting the HMD-to-base connection as a wired connection. Such a wired connection can be very restrictive by limiting the range of motion of a user wearing the HMD, and can be cumbersome when the need arises to frequently move the wire out of the way as the user moves.

Short range or personal area networks such as those based on Wireless Gigabit Alliance (WiGig) certification program standards have been tried. A WiGig system uses beamforming to direct the data transmission to the HMD. The WiGig system uses a radio-based search by signal strength to direct the beam in the correct direction toward the HMD. Such a system, however, often is too slow and cannot perform the search with sufficient speed and frequency to provide smooth video with highly accurate, near real-time perspectives to the HMD, especially when the user is in constant motion. This can result in a significant reduction in video quality where the perspective of the images do not match the real-time position of the HMD or even complete signal loss resulting in a blank or static image and therefore, the system may become unusable.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 1 is a schematic diagram of a virtual reality or augmented reality (VR/AR) head mounted display (HMD) system according to the implementations provided herein;

FIG. 3 is a flow chart of a method of wireless data transmission for head mounted displays according to the implementations herein;

FIG. 4 is a flow chart of a method of wireless data transmission for virtual or augmented reality head mounted displays according to the implementations herein;

DETAILED DESCRIPTION

Figure 2:
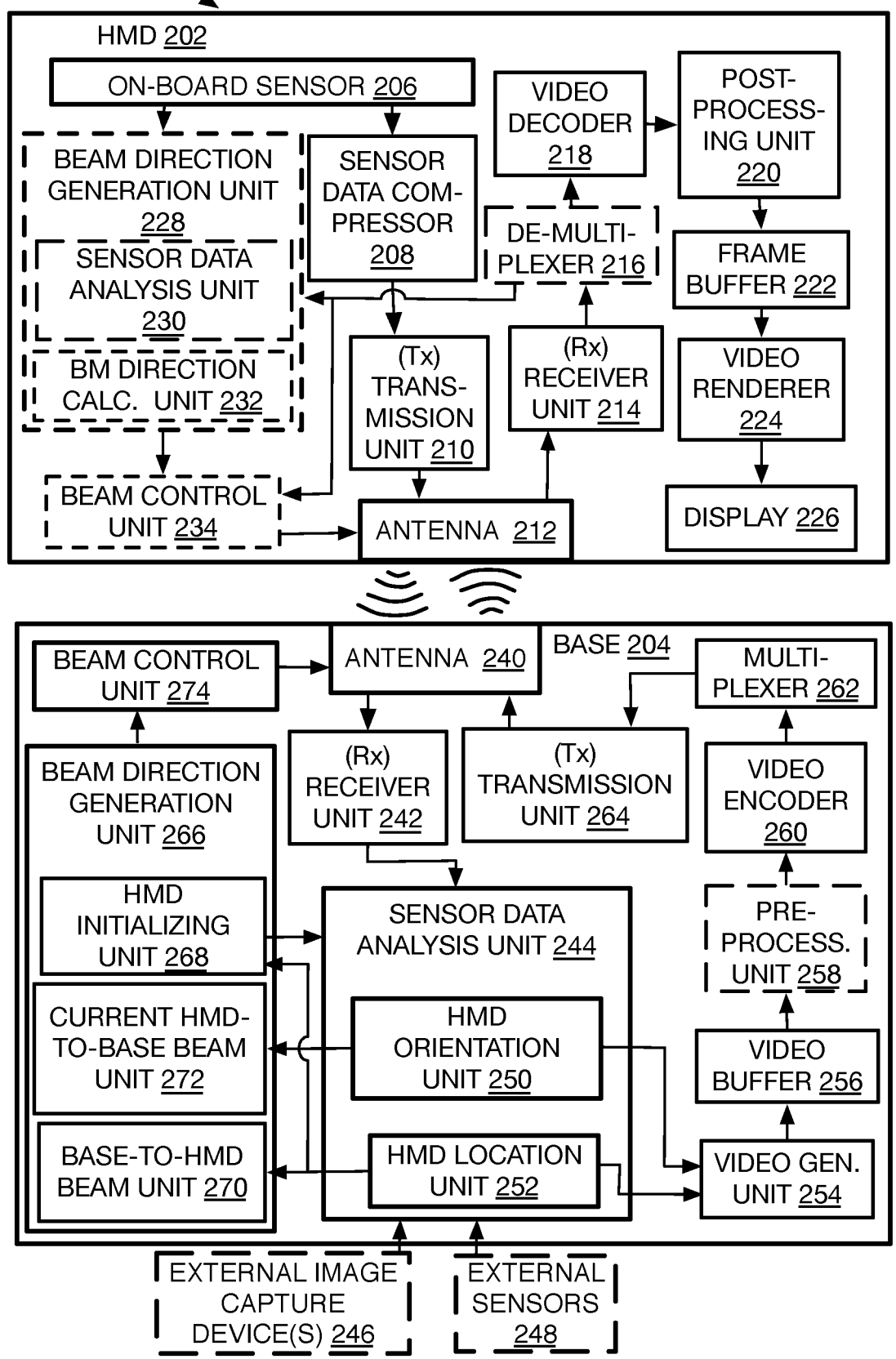
FIG. 2 is a schematic diagram of a system for generating a virtual or augmented reality on an HMD according to the implementations provided herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, smart phones, webcams, video cameras, video game panels or consoles, set top boxes, and so forth, may implement the techniques and/or arrangements described herein being, or being remotely connected to, a head mounted display or other wireless devices to direct a transmission beam to the device, such as a phone, tablet, etc., as long as the device was configured with a low latency, high precision capability describing the position of the device at any instance. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination of these The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of wireless data transmission for virtual or augmented reality head mounted displays.

As mentioned above, it is desirable to improve VR/AR HMD systems by eliminating the data transmission cable that tethers the HMD to the base (such as a host personal computer (PC)) in order to provide the user wearing the HMD more freedom of movement. Also as mentioned, the use of wireless networks with large transmission bandwidths, such as WiGig for example, can be used to transmit data between the HMD and the base. The HMD (or AR/VR system) has sensors to indicate the position and orientation of the HMD and that is transmitted to the base, while the base performs calculations based on the positional information generated on the HMD (or AR/VR system) to determine how to render the images displayed on the HMD. The images are then transmitted to the HMD. This allows for a cable free VR or AR experience enabling full freedom of motion within a local environment WiGig, however, uses beamforming to focus the signal transmission directly from the transmitter (or source) to the receiver (or sink) in both directions between the HMD and the base (e.g., both the HMD and the base have both a beamforming transmitter and receiver). Under the conventional application of WiGig, the base is connected to a static dock station and occasional movement could be tolerated through this technique. In a VR application, however, constant motion at the HMD creates a continuous need to refocus (or steer) the directed signal in the direction of a receiver on one of the devices (the HMD or the base), and/or to regenerate the transmission angle of the beam. The transmission angle is the angle of the beam relative to the normalized angle with respect to the plane formed by a WiGig antenna array.

The process of steering or regenerating the beam often involves analysis of the signal strength on the receiver as the beam adapts to determine if an optimal direction is being achieved. In most cases, a search for the best beam direction is determined by scanning a certain area near the last position of the HMD and in a sweeping motion searching for the strongest signal. The conventional implementation in the WiGig solution, however, does not consistently maintain a sufficiently accurate beam due to the latency caused by this steering operation, and therefor results in stuttering (or loss of video smoothness) and lost information as the stream of visual content is sent to the HMD. This results in a mismatch between the image that is shown to the user wearing the HMD and the motion of the HMD. The impact to the user experience can be extremely disorienting where the image provides a view to the user of a stationary scene as if the user is not moving his head while the user knows or feels he is moving his head with the HMD, or vice-versa where the HMD is showing a scene in motion while the user is not moving. This poor video smoothness can render the HMD unusable.

To resolve the issues mentioned above, the present method and system propose to use the sensor data from the HMD (or AR/VR system) to provide real-time HMD position information to automatically focus the signal transmission beam whether from the transmitter at the base to the receiver on the HMD, or the transmitter at the HMD to the receiver at the base. This may include determining a precise initial beam position (or angle) aimed at a start HMD position where the position of the HMD is determined relative to the base. In many conventional sensor-based systems, the sensors may establish a 3D space or model in which the HMD may be moved from position to position, but there is typically no need to determine the position of the base in such a system. During this initialization stage, radio-based searches still may be used. Thereafter, however, sensor data alone, without the use of a radio-based search for the HMD determines a change in HMD position relative to the start HMD position (or some other prior precise location), which indirectly positions the HMD relative to the base so that a beam position from the base to the current HMD position can be determined to transmit images from the base to the HMD. Even with the additional time waiting for the sensor transmission, the total time from the motion of the HMD to the transmission of image data along the correct direct line to the HMD is still significantly recued compared to a conventional system that uses radio-based searching during the run-time use of the HMD. The resulting reduction in latency permits image data to be transmitted to the HMD and continuously displayed in real-time or near-real time as perceived by the user wearing the HMD thereby significantly improving the real-time image displaying function of the HMD system, and providing a high quality experience for the user.

When the HMD is the transmitter, either the HMD or the base may compute the beam position to transmit sensor data from the HMD to the base. This may be accomplished by determining an incident angle that is the change in beam position from the initial beam position to a desired current beam position extending from the current HMD position to the base. The incident angle includes a position component angle that factors the change in translational position of the HMD from the reference position to the current position, and an orientation component angle that factors the rotational change about the HMDs three axes and from the orientation of the HMD at the reference position to the orientation of the HMD at the current position. A number of variations are included herein where one or both of the beam positions are computed by the HMD, base, other electronic device communicating with the HMD and/or base, or some combination of these.

It will be appreciated that real-time (or more precisely, near real-time) refers to the amount of time that is still perceived to be real-time (or sufficiently close to it for viewing images as intended) by a person. By one form, real-time herein may be about 5 ms or less from receipt of the sensor data regarding a position and/or orientation of the HMD to the display of the image.

Referring to FIG. 1, a system 100 for displaying a virtual or augmented reality shows a user 102 wearing an HMD 104 with a strap 108 around the user's head to hold an HMD body in front of the user's eyes. The body 106 holds one or more display screens 110 facing the user's eyes on the inside of the HMD body 106. By some example forms, the HMD body 106 may have sides to block light from entering an interior space between the eyes and the display screen. Other HMDs, such as smart glasses that provide augmented reality, may be open on the sides and may have transparent glass at the location of the display(s). Two displays 110 may be provided with one display for each eye, or alternatively, there may be one single display provided or some other configuration. The displays show the virtual or augmented reality to the user 102 so that the user is provided a personal point of view (POV) as if the user was within that displayed reality world.

The HMD may have an antenna 114 to receive and send radio signals for example, and that provides the signals to a receiver/transmitter (or transceiver) unit 116, which in turn may be wired or otherwise communicating with at least one display manager 118 and at least one sensor unit 112. The display manager 118 decodes image data and has controls for displaying the image data on the screen(s) 110. The sensor unit 112 may have one or more sensors for sensing the position and/or orientation of the HMD 104. The sensed position of the HMD may be coordinates in a 3D space (x, y, z). At first, this space is established by sensors to determine the translational positions of the HMD as the HMD moves in the 3D space. At this point, an HMD position may be determined relative to other HMD positions, but the position of the base 120 in this sensed 3D space may not be established. As explained in detail below, further HMD position calculations using the sensed positions may be used to determine the position of the HMD relative to the base. This may or may not include a different, separate coordinate system where the base is set at the (0, 0, 0) position of the coordinate system for example. The details are provided below.

Otherwise, the sensor unit 112 also may include operations used to determine the orientation of the HMD relative to a reference orientation such as a level, up-right position (or zero orientation) for example where X, Y, Z axes of the HMD 104 are respectively parallel to x, y, z, axes of the 3D space. The orientation may be provided in (i, j, k) degrees where each of i, j, k refers to rotation about a respective axis (X, Y, Z) of the HMD. Other sensors for orientation and/or position of the HMD may be placed on a base 120 or other electronic device communicating with the HMD or other locations external to the HMD and/or the base in order to perform some or all of the beam position calculations described herein. The details are described below. For consistency, orientation of the HMD will be referred to when discussing the tilt or angle of the HMD about its own axes XYZ, and position (or location) of the HMD will be referred to when discussing the translation of the HMD in the directions of the axes (xyz) and the location of an anchor point on the HMD in a 3D space. The beam position then may include an angle alone (and may be referred to as the beam angle), start and end points which may be the anchor points on the HMD and base, or both the angle and points.

The base 120 has a sensor analysis unit 124 that determines the position of the HMD relative to the base, and provides instructions to a beamforming control 126 that controls an antenna 122 on the base and to direct the beam to the HMD 104. While not shown here, the HMD 104 may have its own sensor analysis unit and/or beamforming control unit to direct the beam to the base by controlling the antenna 114 in order to send sensor data to the base. Alternatively, either the base or the HMD may compute a different beam position to transmit at least sensor data from the HMD to the base. The details are provided below.

By one form, the HMD 104 transmits at least sensor data to the base 120 while the base transmits at least images to the HMD 104 and based on, at least in part, the sensor data. The transmission may be conducted over a radio-based steerable transmission beam of a high bandwidth, low latency network, such as Wireless Gigabit Alliance (WiGig) certification program standard IEEE 802.11ad by one example. The centerline of a steerable beam 128 is shown at a beam position 134, and a dashed sensor data transmission line 132 transmitting sensor data from the HMD 104 to the base 120 and a dashed image data transmission line 130 transmitting image data from the base to the HMD represent these transmissions occurring over or along the beam 128 at the beam position 134. By one form, the beam positions are directed between the antennas 114 and 122 of the base and HMD respectively.

The base 120 may be, or may be part of, any electronic device that provides the functions of the base described herein. This may include a dedicated game console that is provided solely for operation of the HMD or may include game or HMD consoles with multiple functions such as those that display a game on a television or monitor, or other boxes such as a TV or set-top box (e.g., a cable or satellite box), and so forth. Otherwise, the base may be a computer such as a PC desktop, laptop, and so forth. Alternatively, the base may be any other electronic device that includes the HMD communication capability described herein such as a smartphone, tablet, television, camera, and so forth. By yet other alternatives, the base 120, at a minimum, has antenna and controls capable of beamforming and is able to store and transmit images to the HMD along the beam whether those images are first generated at the base or generated at another location, and stored on the base. In some of these cases, the images and/or the beam position may be generated at some location remote from the base including a server or computer whether communicating over a local area network or over a wide area network, camera, or other device, and transmitted to the base by a wired or wireless connection. Many other examples can be used as well.

Referring to FIG. 2, an example image processing device or system 200 is shown for implementing the methods described herein and may be used to operate system 100. The system 200 may include an HMD 202 with one or more features similar to that of HMD 104, and a base 204 with one or more features similar to that of base 120. In both cases, the HMD may transmit sensor data to the base, and the base transmits image data to the HMD with perspectives determined by using the received sensor data. The sensor data received at the base also may be used to determine the direction of a radio-transmission beam to be directed to the HMD to transmit the images to the HMD. The HMD also may have the capability to direct a beam to the base to transmit the sensor data to the base and by using its own sensor data. Sensor data used to direct the beams also may be obtained from one or more sensors on the base and/or external to both the HMD and the base. The beam position of the radio-transmission beam to transmit the sensor data from the HMD to the base may be determined either at the HMD or the base or other remote location. In the latter cases, the beam position or angle may be transmitted to the HMD for the HMD to set the beam or angle. By other forms, the base may have the capability to set a receiving beam position to receive sensor data from the HMD rather than the HMD placing a beam at the calculated beam position.

To perform these functions, the HMD 202 may have an on-board sensor unit 206, which may include one or more sensors that at least sense the orientation of the HMD and provide data that indicate the orientation of the HMD. This may include orientation or head tracking sensors such as one or more accelerometers, gyroscopes, and/or inertial measurement units (IMUs) such as magnetometers, HMD integrated camera and computer vision systems for inside out positional tracking, external camera arrays (one or more cameras) to track HMD position, structured light emissions coupled with computer vision systems or scribe monkeys with notepads taking concise notes on device positions, and so forth. The orientation sensors either alone or in combination with other sensors can determine the amount of change in the orientation from a reference orientation such as an up-right forward facing zero orientation for example and in three rotational degrees of freedom about the X, Y, and Z axes shown on system 100 (FIG. 1) and to determine the tilt of the HMD in any direction. As explained below, a start orientation (which also may be referred to as an original, initialization, or reference orientation) of the HMD is an actually measured orientation that may or may not be in the zero orientation, or may be designated a [(0, 0, 0), (0, 0, 0)] orientation for the beam position determination operations mentioned herein.

The on-board sensor unit 206 also may include sensors for position tracking to determine the position and angular orientation of the HMD in a 3D space. In other words, this position measurement is a measure of translation along the x, y, and z axes of a 3D space formed by using the sensors as well as the angular orientation with respect to the reference orientation. The HMD has an anchor point in the sensed 3D space formed by the sensor x, y, and z axes that is considered the location or position point of the HMD. This anchor point is directly or indirectly associated with the antennas described below. Thus, the HMD and base positions' anchor points may be antenna-based points that are a point on the antenna or on the exterior surface of the body of the HMD and/or base that is in proximity to the antenna or is some computed point that is an average (or some other combination) of multiple branches of the antenna where the branches may be controlled individually or together to steer a beam. Otherwise, the anchor point may simply be a middle or end point on the device or some other convenient point as long as the anchor point for position locating purposes is fixed on the HMD and base and is some fixed, known (or calculable) distance that is with respect to the position of the antenna and that is considered the start and/or end (or source and/or sink) point of the radio transmission beam, and for both the HMD and the base.

Many different techniques for measuring the position of the HMD exist. Relative to the HMD, two general different types of position locating techniques are known, inside-out and outside-in. An inside-out technique has one or more position sensors (or receptors) on the HMD and that measures the changes in distance to objects in the environment around the HMD to determine its own position. An outside-in technique has the sensors exterior to the HMD and observes the movement of the HMD. By one form, the sensors may be paired with a projector such as a laser or infra-red (IR) emitter or other light projector. The projector projects light out from the HMD for example, and the sensor on the HMD receives light reflected back from other objects in the room for the inside-out configurations. The outside-in techniques use the opposite configuration where the base 204 or some other external device may have the projector and/or sensor and the light reflects off of the HMD. In some of these cases, the objects to be detected may have markers with varying sophistication in technology to act as reference points. Fiducial markers show in images only with a certain type of light. Some markers may be simple reflectors, others may have barcodes or quick response (QR) codes that convey some sort of information, and so forth. By another approach, the receptor or sensor, whether on the HMD or the base, receives light projected from the opposite device and is able to determine its position from the direction of the light. In a lighthouse technique, the projector floods a room with light for this purpose. By yet other alternatives, sensors may be cameras such as a 3D or RGBD cameras that can reconstruct a 3D space and may provide a depth map. The HMD described herein is not limited to any particular one orientation and position tracking technique, and many different such techniques, or combinations of such techniques, may be used. Other sensor types that could be used include the sensors used for the orientation measurement such as the accelerometer and the IMU mentioned above, as well as a global positioning sensor (GPS), and so forth.

The on-board sensor unit 206 (or other sensors) may generate raw sensor data, and the raw sensor data that is used to create the perspective of the images to be displayed on the HMD is then compressed or otherwise formatted by a sensor data compressor 208 for transmission to the base 204. This may include packing of the data into a bitstream for example by known techniques. The compressed and/or packed sensor data then may be provided to a (Tx) transmission unit 210 that uses an antenna 212 to transmit the sensor data along a radio-transmission beam to the base 204. The Tx unit 210 may be considered separate from a (Rx) receiver unit 214 on the HMD or may be part of a transceiver that transmits and receives data with the receiver Rx unit 214. The transmission and receiver units 210 and 214 usually have antenna arrays of varying configurations and antenna count that define the accuracy and width of the transmission beam generated by each device.

Also as mentioned, the network used to communicate between the antenna 212 on the HMD and the antenna 240 on the base 204 should be a high bandwidth, low latency network such as WiGig by the example used herein, although other networks could be used. By one form, the network is a short-range network in order to provide real-time video. 802.11ac Wave 2 supports beam forming as well but may not have sufficient latency and throughput characteristics to support AR/VR applications.

The antenna 212 may be one or more steerable beamforming antenna with branches that can transmit in different phases to direct a beam in a certain direction when transmitting. The steering may be performed electronically, mechanically, some combination of these or by other ways. The antenna 212 may be considered a single antenna or may include at least two separate antennas with one antenna to receive the image data and one antenna to transmit the sensor data. The antenna 212 may be controlled by a beam control unit 234 to steer the beam toward the base as described in further detail below.

By another alternative, the antenna 212 cannot be steered and an antenna 240 on the base can be steered for both transmitting and/or receiving. Thus, when a beam position is computed for transmitting at least sensor data from the HMD 202 to the base 204, the antenna 240 at the base 204 may be controlled to direct a reception beam toward the antenna 212 for receiving data. This may be a separate beam position than the beam position used to transmit image data from the base to the HMD. An alternate implementation could be to employ an omnidirectional antenna on the HMD for sensor data using a low latency, low bandwidth networking capability.

During an initialization stage, the conventional methods may be used to perform a radio-based search to determine a beam position and steer a radio transmission beam to transmit the sensor data to the base. Thereafter, once a start HMD position relative to the base is established, an incident angle between an initial beam position and a desired current beam position may be determined and based on sensor data instead of radio-based searches as described below. The incident angle is the beam position to transmit the sensor data from the HMD to the base. The computations to determine the incident angle may be performed at the base or the HMD, and both alternatives are shown on system 200.

Turning for now to the operation of the base 204, the base antenna 240 receives sensor data transmitted by the HMD 202. As with the antenna 212, the antenna 240 also may include at least two antennas, at least one for receiving sensor data and at least one for transmitting image data, or may be a single antenna that performs both tasks. By one form, at least the antenna transmitting image data may have multiple branches or other structure to provide a beamforming antenna and in order to steer the beam as mentioned with antenna 212.

A (Rx) receiver unit 242 may receive the sensor data, perform any decompression and formatting that is required, and provide the sensor data to a sensor data analysis unit 244. The sensor data analysis unit 244 also may receive sensor data from one or more external sensors 248 including sensors which may or may not be on the base (where external herein refers to external to the HMD), and/or external image capture devices or cameras 246. The external sensors may be as described above to determine at least the position and/or the orientation of the HMD. The external cameras 246 may be used as a sensor as well as to capture images of the HMD to determine the position and/or orientation of the HMD. Alternatively, such a camera may capture images of the surrounding area near the user to form an environment in an augmented world, and/or to capture images of the user to construct an avatar of the user. Images of the user may be used to an avatar of the user in realistic poses in a virtual or augmented world viewed by more than one user each with their own HMD 202 when desired. The sensors 248 and cameras 246 (and projectors when used) may be communicatively connected, either wirelessly or wired, to the base or are considered mounted on, or part of, the base.

The sensor data provided from the HMD may be raw sensor data or may be sensor data that has already been analyzed at the HMD so that a 3D HMD position and/or orientation is provided to the base. Otherwise, the sensor data analysis unit 244 receives the raw sensor data from the HMD and determines the HMD position and/or orientation. In this case, the sensor data analysis unit 244 has an HMD orientation unit 250 that analyzes the raw sensor data and forms a current HMD orientation relative to a zero orientation for example. This may include establishing an HMD orientation in rotational units $(i_n, j_n, k_n)$ where i, j, and k are angles respectively about the HMD's own X, Y, Z, axes as shown on system 100, and where (0, 0, 0) is either the zero orientation or a designated start orientation. This is an HMD orientation established from the orientation sensors and alone is not yet relative to any other position of the HMD, and may or may not be relative to the position of the base depending on whether the sensors also determine the base position. Alternatively, these operations could be performed at the HMD as described below such that the HMD orientation unit 250 may receive the already determined HMD orientation form the HMD.

An HMD location unit 252 also may be provided to determine a current (x, y, z) HMD position of the HMD in an HMD or sensor 3D space, and by using the sensors mentioned above. Initially, this sensor-based HMD position may or may not be obtained relative to the base. Either way, the same computed HMD sensor orientation and sensor position can be used for both determining image perspectives to display images as well as to determine a radio transmission beam position.

As to image generation, a video generation unit 254 then receives the HMD orientation and position data for a current HMD position. This may involve determining the position and orientation of the HMD in a model of the 3D space to generate the image to be displayed on the HMD. In effect, the position and orientation of the HMD indicates the position of the display screen of the HMD in the 3D model space, and in turn, the position and orientation of a virtual camera in the 3D space that would form such an image. For augmented reality, this may include the capture of real-world images from a camera and that are converted into a depth model and then projected to the depth model before the new image is formed. Once the image is formed, it may be placed in a video buffer 256 until it is retrieved for compression and transmission to the HMD for display.

After the images are formed for virtual or augmented reality, a pre-processing unit 258 may apply pre-processing to the image data sufficient to perform encoding of the images for transmission to the HMD. However, when augmented reality is being performed and real-world images were captured by a camera, some of these tasks may be performed before or during the video generation to prepare the captured images for 3D modeling as mentioned. Also, the type of pre-processing may depend on whether the images are real world images obtained from a camera on the HMD for virtual reality or whether the images are entirely animated images from a fictional virtual world. The pre-processing unit 258 may perform demosaicing, de-noising, filtering, color space conversions (such as RGB to YUV), resolution conversions, division into frames, and other pre-processing operations that may be needed for sufficient image processing and compression desired as described herein. Other pre-processing operations may include depth-sensing, depth-processing, and background/foreground segmentation (or keying) to name a few examples. Also, it will be appreciated that pre-processing units could be located on the HMDs and/or external cameras when used, in addition to, or instead of, the base 204, and may be provided in a different order than that shown on system 200 when needed.

A video encoder 260 then may compress the images based-on known standards such as HVEC, MPEG, VP #, and so forth before providing the image data to a multiplexer 262 that adds other non-image data. This may include computed HMD position or orientation data when such data is not computed by the HMD but is used by the HMD to transmit sensor data. It also may include other image overhead and display control data for displaying the images on the HMD.

A (Tx) transmission unit 264 then formats the data for wireless transmission and sends the data out through antenna 240. A beam control unit 274 may control the antenna 240 and steer a radio-based transmission beam toward the HMD and to a desired beam position as described elsewhere herein. By one form, at least during an initialization stage, the beam control unit 274 may use the antenna 240 to perform a search for the HMD in order to aim the beam at the HMD and as described above. The image and other data is then received at the antenna 212 over the short range wireless network described above.

At the HMD 202, the antenna 212 may receive the image data from the base 204. The receiver unit 214 on the HMD 202 receives the compressed image data and may provide the data to de-multiplexer 216 when combined with audio data and/or other non-image data for controlling the HMD or display parameters. A video decoder 218 then decompresses the image data, and a post-processing unit 220 performs post-processing tasks to display the images. This may include color space conversion (from YUV back to RGB, for example), resolution conversion, other scaling conversions, and so forth. The images then may be placed in a frame buffer 222 to be retrieved as needed by a video renderer 224 that controls the images placed on a display 226 on the HMD 202.

Turning now to the beam position determination, and as mentioned above, an initialization stage is used to establish a more precise initial beam position and a start HMD position and HMD orientation that is sufficiently accurate to be used as a reference position and orientation during run-time in order to determine the position of the current HMD position relative to the base and a beam position to perform wireless, radio data transmissions. In the initialization stage, the base 204 may establish an initial radio-transmission beam directed to the HMD 202 using known techniques, including the radio-based search for a strongest signal or other indicator of the HMD location, and that initially can be used to transmit images to the HMD. Once the initial beam is established, the position of the HMD 202 relative to the base 204 may be computed to set the start HMD position and start HMD orientation. Changes in position and orientation are then computed from the start position and orientation going forward so that a current HMD position relative to the base can be determined each time, or individual times, the HMD is moved.

Many different ways may be used to track the HMD position relative to the base. By one example, the HMD location unit 252 may determine the start position of the HMD relative to the base during the initialization stage by using two or more of the obtained sensor-based HMD positions. Specifically, and to provide the beam positions during initialization, the user may hold the HMD in the start position, and then may move to at least one more position wearing or holding the HMD in a fixed non-moving state at each position. The instructions to the user to move from one position to the other may be by audio or visual instructions to the user such as by instructions shown on the HMD display 226 to stay at a location while wearing the HMD for a specific time period at each location. By one example, the user wearing the HMD is to move directly sideways in front of the base so that the only significant change from position to position is in one direction (x) while the distance (y) away from the base (shown as distance d (FIG. 5)) and height z distances remain at least generally the same. The distance d is the perpendicular length from the base to the line connecting two HMD initialization positions as explained below. The y (or d) and z distances are assumed to remain constant for the start HMD position calculation example here.

A radio-based search is then performed at a number of initialization stage HMD locations to set the beam position for each of those locations. The radio-based search may include a search for the strongest radio signal while the user holds or wears the HMD at the HMD position. The strongest signal found by the search should be the antenna 212 of the HMD in most cases. The base 204 receives the data of the signal strength in a certain relatively wide area near the base. Once the HMD is found, and specifically the location of the antenna 212 on the HMD, the beam is directed in that direction toward the HMD.

Once directed, the angle of the beam position is now known by the base. Thus, the beam control unit 274 then may provide indication of an initial beam position directed toward the initial or start HMD position and at least one more beam position directed toward other HMD initialization positions. The indication or angle of the beam position may be provided to an HMD initializing unit 268 of a beam direction generation unit 266. The angles of the beam positions are designated as the α' and β' angles described below (FIG. 5) for this example. These angles indicate the beam position direction relative to a base reference line (here along line or distance d that extends perpendicular from the base).

The HMD initializing unit 268 also retrieves the sensed (x, y, z) position coordinates of the HMD initialization positions from the HMD location unit 252 and once the beam position is established for the sensed position. The length L is the length between two HMD positions measured by subtracting the sensed position coordinates In more detail, the distance d extends perpendicularly from both the base and the length L. Particularly, the distance d extends perpendicularly from a base front or reference line Ba that includes the point where radio signals are received or transmitted and the radio transmission beam starts or is received, such as an antenna-related point as mentioned above. Once the initializing unit 268 determines the distance angles α' and β' and the length L between the two HMD initialization positions, then the distance d as well as the length from the perpendicular distance to the individual start HMD position can be calculated. The result is an ($\ell$, d) distance from the base, which may be labeled at position (0, 0) and to the start HMD position, which is also the initial beam position running along an HB (FIG. 6) beam line or distance from the start HMD position to the base. The ($\ell$, d) beam position (or start HMD position or HMD_Position_One) then may be saved to determine a change in HMD position relative to the start HMD position and during run-time use of the HMD. The ($\ell$, d) directions become the [x, y] directions in a 2D or 3D space defined by the start HMD position and the base. While this calculation assumes the user wears the HMD at the same height when moving from HMD position to position during the initialization stage so that there is negligible change in height, it will be understood that the same calculations can be made by adding a change in height z also as described below.

As to the initial orientation of the HMD in the start HMD position, the HMD orientation unit 250 also may provide the sensed orientation in ($i_1$, $j_1$, $k_1$) degrees in rotation about the HMD X, Y, Z axes and relative to the zero orientation which is an upright-straight forward orientation as described above. This orientation of the HMD in the start HMD position also may be stored to be differenced with subsequently obtained current HMD orientations to compute a change in orientation during run-time. This change in orientation then can be used to determine a beam position to transmit sensor data from the HMD back to the base as described below.

During run-time, a new beam position may be determined each time the HMD has moved some minimum amount (whether in position or orientation) or may be updated after a certain time interval regardless of motion. This may or may not be the same as that used for updating the image perspectives. Either way, the sensors provide new sensor data from the HMD, base, or other location, and to the base to update the sensor position of the current HMD position, and is provided to the HMD location unit 252 as described above. The HMD location unit 252 provides the current sensed HMD position in (x, y, z) coordinates of the 3D space of the HMD that is the same sensed 3D space as the sensed coordinates of the start HMD position. This current sensed HMD position is provided to the base-to-HMD beam unit 270.

Also, the HMD orientation unit 250, as mentioned above, generates the values for the current angular orientation of the HMD about its own X, Y, Z axes such as ($i_n$, $j_n$, $k_n$) that are the rotational degrees about the respective axes and relative to the zero orientation. This is an HMD orientation established from the orientation sensors and is not yet relative to any other position of the HMD, and may or may not be relative to the position of the base depending on whether the zero orientation of the HMD was set parallel to the x, y, z, axes forming the 3D space of the base 204 for example. The HMD orientation unit 250 provides the current orientation of the HMD to the current HMD-to-base beam unit 272.

The base-to-HMD beam unit 270 determines the change in HMD position from the stored start HMD position to the current HMD position by determining the difference in each of the three (x, y, z) coordinates between the two positions. The change is then added to the ($\hat{\ell}$, d) base-relative coordinates of the start HMD position thereby obtaining adjusted coordinates of the current HMD position but now relative to the base. The coordinates of the current HMD position can then be used to determine an updated radio transmission beam angle α' for an updated beam position. This beam position may be used for transmitting image data from the base to the HMD and is provided to the beam control unit 274 to control the antenna 240 to direct the beam along the new beam position and to the current HMD position. These beam positions are determined without run-time radio-based searches to set the beam positions.

As the beam position to transmit sensor data to the base, the current HMD-to-base beam unit 272 determines an incident angle on which the radio beam is to be positioned to transmit the sensor data (and other data when desired) from the HMD and back to the base. The incident angle factors both (1) the change in angle from the initial beam position form the base to the start HMD position and to a desired beam position extending from the base to the current HMD position, as well as (2) the change in orientation angle from the orientation of the HMD in the start position to the orientation of the HMD at the current position.

To determine the first (position) component of the incident angle, the current HMD-to-base unit 272 uses the sensed coordinates of the start and current HMD positions to determine a change in each of the three (x, y, z) coordinates. The current HMD-to-base unit 272 then determines the change in angle from the start HMD position to the current HMD position, and relative to the base. This is accomplished by using the initial beam position H as an axis (such as an x axis) where the y and z axes are perpendicular to the beam position H. Then, the change in angle relative to the initial beam position and the base is determined by using trigonometric equations, which results in position angles ($\Phi_{xn}$, $\Phi_{yn}$, $\Phi_{zn}$) defining a line (or vector P as in FIG. 6) from the current HMD position to the base, and from initial beam position H. The details are provided below.

To determine the second (orientation) component of the incident angle, the current HMD-to-base beam unit 272 determines the difference between the orientation or rotational position of the HMD at the start and current HMD positions. These differences are added to the position angles to determine a final incident angle $\Phi_{HMD}$. The incident angle then may be transmitted back to the HMD when the incident angle is computed at the base or other location rather than the HMD, and implemented by steering the antenna 212 at the HMD 202. Otherwise, the incident angle may be provided to the beam control unit 274 to control the antenna 240 at the base 204 to form a beam at a receiving beam position to receive sensor data from the HMD, either way being performed without the use of a radio-base search.

Turning to run-time beam position operations on the HMD, by one form, the HMD 202 receives the incident angle as calculated by the base 204. By this approach, the incident angle is transmitted to the antenna 212 of the HMD, and is extracted and provided to the beam control unit 234. The beam direction control unit 234 then directs the beam from the HMD to the base 204 to transmit sensor data to the base.

By an alternative form, the HMD 202 computes the incident angle instead of, or in addition to, the base 204 performing the incident angle computation. In this case, the sensor data from the on-board sensor 206, base 204, or other sensing devices may be provided to a beam direction generation unit 228. It will be understood that the provided sensor data after the initialization stage does not include or primarily rely on a radio-based search, such as a signal strength search by one example, performed to steer a radio transmission beam. The beam direction generation unit 228 may have a sensor data analysis unit 230 and a beam direction calculation unit 232. The sensor data analysis unit 230 may receive raw sensor data and analyzes the data to at least determine a current orientation of the HMD, as described with the HMD orientation unit 250. The sensor data analysis unit 230 may also receive and/or generate sensor position (x, y, z) coordinates of the current HMD positions, but also could be used to compute the coordinates of the start HMD position during the initialization stage for example.

Thereafter, the beam direction calculation unit 232 may use the current HMD orientation and position to determine the incident angle of the beam position or direction to transmit the sensor data to the base 204. Specifically, the start position and orientation may be obtained from a memory on the HMD or as transmitted from the base. The beam direction calculation unit 232 also computes or otherwise obtains the distance H from the base to the start HMD position. The change in orientation (i, j, k) and position (x, y, z) between the start and current orientation and position respectively then may be computed. Once these changes are computed, a single total incident (or final beam) angle from the current HMD orientation and position to the base may be determined by the beam direction calculation unit 232 using the same algorithms as explained for the current HMD-to-base unit 272 except that these computations are performed at the HMD for this example. The incident angle then may be provided to the beam control unit 234, which in turn controls the phase and/or other factors of the antenna 212 to transmit sensor data along the incident angle to the base, thereby establishing the beam at the desired beam position without the use of a radio-based search.

By another alternative, once the base 204 establishes an initial beam position, thereafter, the HMD 202 may generate the beam positions for transmission both to and from the base 204. By another option, he HMD may perform all beam position calculations, including during the initialization stage, where the HMD determines beam positions and transmits the beam positions to the base when the base is to set either transmitting or receiving beam positions. In any of these cases, the HMD 202 performs the computations and transmits the desired beam position to the base 204 to steer the beam in the correct direction to transmit images to the HMD 202. Otherwise, the HMD may provide the beam position angle to its own beam control unit 234 to steer a receiving beam at antenna 212 to receive image data from the base, either in addition to the steering at the base, or instead of the steering at the base (where the base does not have steering ability).

It will be appreciated that while a single HMD is shown, multiple HMDs could be controlled to provide a multi-user environment and by using a separate antenna system for each HMD whether by a single base or multiple bases. Other systems could use a shared antenna for multiple HMDs. One approach to implementing a multi-user environment is to assign a 1:1 relationship between each HMD and a corresponding base within the same environment. Ideally, all of the bases would be distributed broadly across the environment to reduce the likelihood of an HMD not paired with a given base transmitting data to that base. This configuration would work best with bases installed on the ceiling of the environment to minimize obstruction of the beam by the users in the environment.

It will be appreciated that other components not shown may be provided for the system 200, such as those shown with systems 1000, 1100, and/or 1200 described below. It also will be appreciated that a depicted component includes code and/or hardware to perform the function of the depicted component and may actually be located in a number of different places or components on a device that collectively perform the recited operations of the depicted component.

Referring now to FIG. 3, by one approach an example process 300 is a computer-implemented method of wireless data transmission for virtual or augmented reality head mounted displays. In the illustrated implementation, process 300 may include one or more operations, functions or actions as illustrated by one or more of operations 302 to 310 numbered evenly. By way of non-limiting example, process 300 may be described herein with reference to example image processing systems 100, 200, 500, 600, 1000, 1100, or 1200 of FIGS. 1-2, 5-6, and 10-12 respectively, and where relevant.

Process 300 may include "sensing a 3D position of at least one head mounted display (HMD) arranged to display video sequences to a person" 302. As mentioned herein, a user wearing the HMD with one or more displays is shown images on display screens so that the user views a virtual or augmented reality which may be in point of view (POV) so it seems that the user is in the virtual or augmented reality. Sensors on the HMD or external to the HMD, such as on a base communicating with the HMD or some other external location, may be used to detect a 3D location and orientation of the HMD in a 3D space, and this may occur after each or individual times the HMD is moved, or after certain time intervals.

By one example, an initialization stage is performed, and the beam position is initially determined using radio-based search methods for at least two HMD locations where the HMDs are held still some time period for the initialization stage. The angle of the beams from the base to these positions are then known. The sensed HMD locations and the angles on these conventional beams are then used in a triangulation algorithm, by this example, to determine a start 3D position that is relative to the base. Both the start HMD position and orientation of the HMD at the start HMD position may be saved for later use.

Thereafter the initialization stage, however, whenever the HMD is moved, or after some time interval, the beam position may be updated by using the latest sensed position, and orientation, of the HMD without using a time-consuming radio-based search. The following operations are directed to those operations after the initialization stage.

Thus, process 300 may include "determining the location of the sensed 3D HMD position relative to a base" 304. In other words, the sensed 3D HMD position may be in a 3D space that is typically used to determine the position of the HMD relative to other positions of the HMD, and the location within the 3D space itself. The position of the base is normally not needed to determine such 3D positions. Here, however, the position of the HMD relative to the base is used to determine beam positions.

By one approach then, the change in position from the start HMD position to a current HMD position is determined, and in one example, by differencing the coordinates of the two positions and adding the difference to the start HMD position, resulting in a current HMD position that is relative to the base.

Thus, process 300 may include "wherein the sensing and determining is performed with other than a radio-based search" 306. Specifically, after the initialization stage, even though radio-based transmissions at a beam position are to be used to transmit data between the base and the HMD, the location of the beam position is not determined by using a radio-based search. Other sensors as described elsewhere herein are used instead.

Process 300 may include "determine a beam position of a wireless radio-based transmission beam by using the 3D HMD position" 308. This position, now with coordinates relative to the base, can then be used to compute the angle of a beam position from the base to transmit data between the base and the HMD.

Process 300 then may include "wirelessly transmit images from the base and directed toward the HMD along the beam to display the images to the person and at the HMD" 310, and particularly, where the data is transmitted along the beam position established by using updated sensed data rather than a radio-based search.

Many variations and alternatives to the process provided above exist. The HMD 3D positions may be used to determine a second beam position to transit sensor data from the HMD and to the base by determining an incident angle from the HMD (or more particularly, the initial beam position). This is performed by factoring both (1) the change in angle relative to the base and associated with the change in HMD position and change in beam position, and (2) the change in orientation of the HMD at the start position to the orientation of the HMD in the current HMD position.

The computations for determining either of the beam positions (for transmitting images or sensor data) could be at the base, the HMD, or both, and in any combination such as both on one device (the HMD or base) or one each at one device. Also as mentioned, there may be multiple HMDs each with its own base or antenna system or the base and antennas may be shared.

By another alternative, the change in position and orientation may be the change from the last HMD position in a series of HMD positions, rather than the start HMD positions. In this case, the change in HMD position and orientation is simply added to that of the last position analyzed to provide a position relative to the base.

Referring now to FIG. 4, by one approach, an example process 400 is a computer-implemented method of wireless data transmission for virtual or augmented reality head mounted displays. In the illustrated implementation, process 400 may include one or more operations, functions or actions as illustrated by one or more of operations 402 to 422 numbered evenly. By way of non-limiting example, process 400 may be described herein with reference to example image processing systems 100, 200, 500, 600, 1000, 1100, or 1200 of FIGS. 1-2, 5-6, and 10-12 respectively, and where relevant.

Process 400 includes one example initialization process to establish the relative positions of the HMD and the base with sufficient accuracy to provide a start or initial HMD position in 3D space that includes a position of the base. Subsequent HMD positions relative to the base can then be determined by measuring the change in HMD position directly or indirectly form the start HMD position so that the HMD image processing system can reduce or eliminate radio-based searches for the HMD in order to direct a radio-based transmission beam to or from the HMD, at least after the initialization process. By this approach, the base is at a fixed location and is described as above. At a minimum, the base is to be fixed once initialization commences and until the start HMD position is refreshed or updated.

Preliminarily, one or more users each with their own HMD may initialize the HMD to determine an HMD position relative to the base. The user may be provided instructions on the display of the HMD, electronically on the device operating the HMD image processing system (or HMD system for short), other devices, or by other ways. The user is to wear the HMD and stand near the base, and in the base's field of operation when limited. The user is to stand as still as possible while a first or start HMD position is determined, and when indicated, or after a specified time period, the user is to move sideways in front of the base to at least one more second (or subsequent) position and then stand still again.

Figure 5:
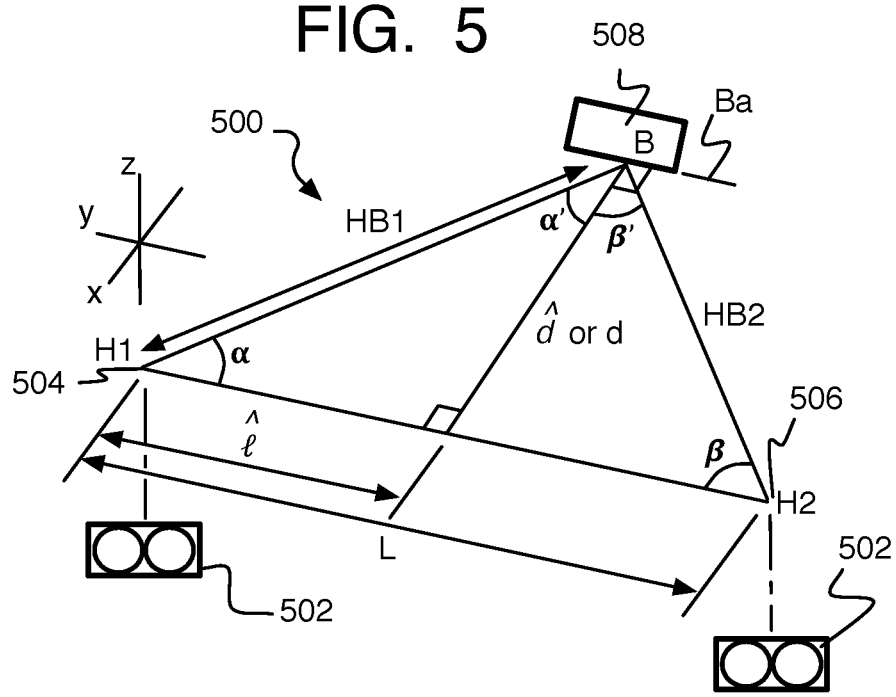
FIG. 5 is a schematic diagram of one example VR/AR head mounted display system arranged to perform an initialization process according to the implementations provided herein.

Referring to FIG. 5, this arrangement is displayed on an HMD system 500 that has an HMD 502 placed at a start HMD position 504 and then a second HMD position 506 both in front of a base 508. Other details will be described below. The user may move at least once but could be more times to form some sort of average position value. For the example initialization process described herein, it is assumed that the user wearing the HMD and moving sideways in front of the base while standing does not change the height or z coordinate in 3D space of the HMD. It is also assumed that by the user moving sideways in front of the base the perpendicular distance d (on system 500), or x coordinate of the 3D space by this example, also remains constant so that the movement of the HMD 502 from the start HMD position to the second HMD position along path L for example is parallel to the base antenna reference line B a at the base so that distance d is perpendicular to both L and the base forward reference line Ba.

The line Ba on the base 508 includes the point that is considered the transmission point or start of the radio-based transmission beam, and may be the same point for receiving data from the HMD although it could be different. Likewise the points H1 (504) and H2 (506) are also considered the radio beam transmission and/or reception points but could be different points. As described above, these points may or may not relate to the structure and position of the antenna on each of the devices. Thus, the 3D (x, y, z) coordinates for the HMD and the base may be start and end points of the beams but could be other locations on those devices that are to be considered the 3D space anchor points for those devices. Thus, while the end point of a beam may be different than the actual 3D location of one of the devices, it will be understood that the distance from one to the other, when not the same, can be fixed for the device and determined easily when performing computations. For clarity, it may be assumed when convenient herein that the beam endpoints are located at the same 3D anchor positions as the HMD and base.

Process 400 may include "establish initial beam between HMD and non-moving base with HMD in at least a generally fixed position" 402. In some forms, the 3D space established by the sensors will not determine the position of the base relative to the HMD at all or with sufficient accuracy to transmit data between the base and the HMD. In these cases, the radio-based beam search may be performed during initialization. This may include determining the strongest radio signal by a number of known radio-based search operations, and then controlling antenna branches either mechanically and/or electronically to perform beam-forming and steer a transmission beam toward the HMD. When the beam is established, the angle of the beam position is known to the beam control unit or beamforming control, here referred to as angle $\alpha'$ (FIG. 5), and where the angle is relative to the Ba reference line, or here the distance d since the distance d is assumed to be perpendicular to the Ba reference line. Once the beam position angle is established for the start HMD position, the base may obtain the sensed position data of the position of the HMD where it receives the beam transmission.

Accordingly, process 400 also may include "sense initial HMD location" 404 also referred to as the start HMD position. As already described in detail above, many different types of sensors may be used whether mounted on or in the HMD, base, or other external location. As mentioned, this may involve optical, infra-red, or other beam detection, whether direct from a projector or from reflectors on the HMD or base. The sensors also may include cameras that form depth maps or otherwise generate a 3D space and locates the position of the HMD within the 3D space. A GPS-type of sensor also may be used when sufficiently accurate. Also, this operation may include the use of internal sensors on the HMD that may or may not also be used to determine the orientation of the HMD as well, such as head tracking sensors including one or more accelerometers, gyroscopes, and/or inertial measurement units (IMUs), and so forth. Many different sensors and combinations of sensors can be used. The result is a sensed (x, y, z) position coordinate of the start HMD position.

Once the sensed start HMD position is established, the process 400 may include "correlate HMD location to initial beam position" 406, or in other words, determine the start HMD position relative to the base position. By this example, process 400 may include "move HMD at least once to a new location" 408 and to a second 3D HMD position as a user is wearing the HMD as mentioned above or otherwise moved in a different way, such as held by the user.

Process 400 may include "establish beam at new location(s)" 410, and as described above to perform a radio-based search to determine a strongest signal or other indicator of the HMD position, and then to direct a radio-based transmission beam at the HMD in the second HMD position (H2 in FIG. 5). This operation also includes determining the beam position angle β' (FIG. 5) as the beam is directed from the base and to the second HMD position, and as mentioned above for α'.

Process 400 may include "determine position of HMD(s) at new location(s)" 412, and again by using sensors to determine the (x, y, z) coordinates of the HMD at the second HMD position and in the same 3D space as the start HMD position.

While still referring to system 500 (FIG. 5), process 400 may include "determine start HMD position relative to the location of the base using triangulation with direction of beams and HMD locations" 414. By triangulation, the distance d to the base as well as the distance $\hat{\ell}$ from the vector $\hat{d}$ (or distance d) to the start HMD position H1 may be determined by using the included angles α and β which are the angles between the length L connecting the two HMD positions and the established beam positions HB1 and HB2 as follows:

Angle α' is known and indicates a specific beam position formed when the HMD is located at the start HMD position, and the included angle α is:

$$\alpha = 90 - \alpha' \quad (1)$$

Angle β' is known and indicates a specific beam position formed when the HMD is located at the second HMD position, and the included angle θ is:

$$\beta = 90 - \beta' \quad (2)$$

Length L between the two discrete HMD positions H1 and H2 is calculated as:

$$L = |\sqrt{((x_2-x_1)^2 + (y_2-y_1)^2 + (z_2-z_1)^2)}| \quad (3)$$

where the start HMD position is $(x_1, y_1, z_1)$ while the second HMD position is $(x_2, y_2, z_2)$. Applying a triangulation algorithm, distance d is:

$$d = \left( \frac{L * \sin(\alpha)\sin(\beta)}{\sin(\alpha + \beta)} \right) \quad (4)$$

With d and α' known, length $|\hat{\ell}|$, as shown on system 500, describing the distance from the start HMD position to the vector $\hat{d}$ (at position d) that is both perpendicular to $\hat{\ell}$ and intercepts the base beam transmission source point.

$$|\hat{\ell}| = \tan(\alpha') * d \quad (5)$$

The position of the HMD with respect to the base is now established at the start HMD position where:

$$HMD\_Position\_One = [|\hat{\ell}|, d] \quad (6)$$

where the base transmission source point may be set as (0, 0, 0) and $[|\hat{\ell}|, d]$ can be defined as [x, y] coordinates from the base, and going forward can be used to determine any HMD position relative to the start HMD position, which in turn, is relative to the base. Further details are provided below with the run-time process 700.

For this example, it is assumed z=0 so that z is eliminated for this equation, but it will be understood that the same above equations adjusted to include a z dimension can be used when there is a change in height z from the start HMD position to the second or subsequent positions. By one approach, this same process may be applied to determine beam transmission angles along vertical HMD transitions. This process would use an initial position followed by a subsequent HMD position displaced along the z-axis.

Process 400 may include "determine orientation of the HMD at the start HMD position" 416. The orientation is determined by the head tracking sensors mentioned above or other sensors that can provide such an orientation, and which may be on or internal to the HMD but may be at the base or other external location depending on the type of sensor. The angle of the HMD relative to its own X, Y, Z axes and zero orientation as described with system 100. This may provide an orientation of the HMD at the start HMD position and facing in $(i_1, j_1, k_1)$ degrees each being an angle about a respective X, Y, and Z axes.

Process 400 may include "store the start HMD position relative to the base and the start HMD orientation" 418, where at least the start HMD position ($\hat{\ell}$, d) relative to the base is stored but the sensed (x, y, z) start position may be stored as well, and the orientation (i, j, k) of the HMD at the start HMD position is stored.

Then during run-time, process 400 may include "determine a change in position from the start or prior HMD position to a new HMD position when the HMD is moved" 420. This operation is detailed below with process 700 where the change in position from the start HMD position to a current position is determined, and then process 400 may include "determine a new beam position by using the change in HMD position" 422. This is performed without performing a time consuming radio-based search. It is also understood that instead of the start HMD position, the current position may be compared to any prior HMD position that already has a position established relative to the base. The details and other variations are provided below.

By an alternative approach, the radio-based search may be eliminated during the initialization stage as well when the sensors are able to determine the location of the multiple HMD positions and the base position each of which indicate a start and end position of transmission beams for the devices (when the position point is not the same as the beam endpoints) and with sufficient accuracy to be able to rely on those positions for transmission of data along the beams.

Figure 6:
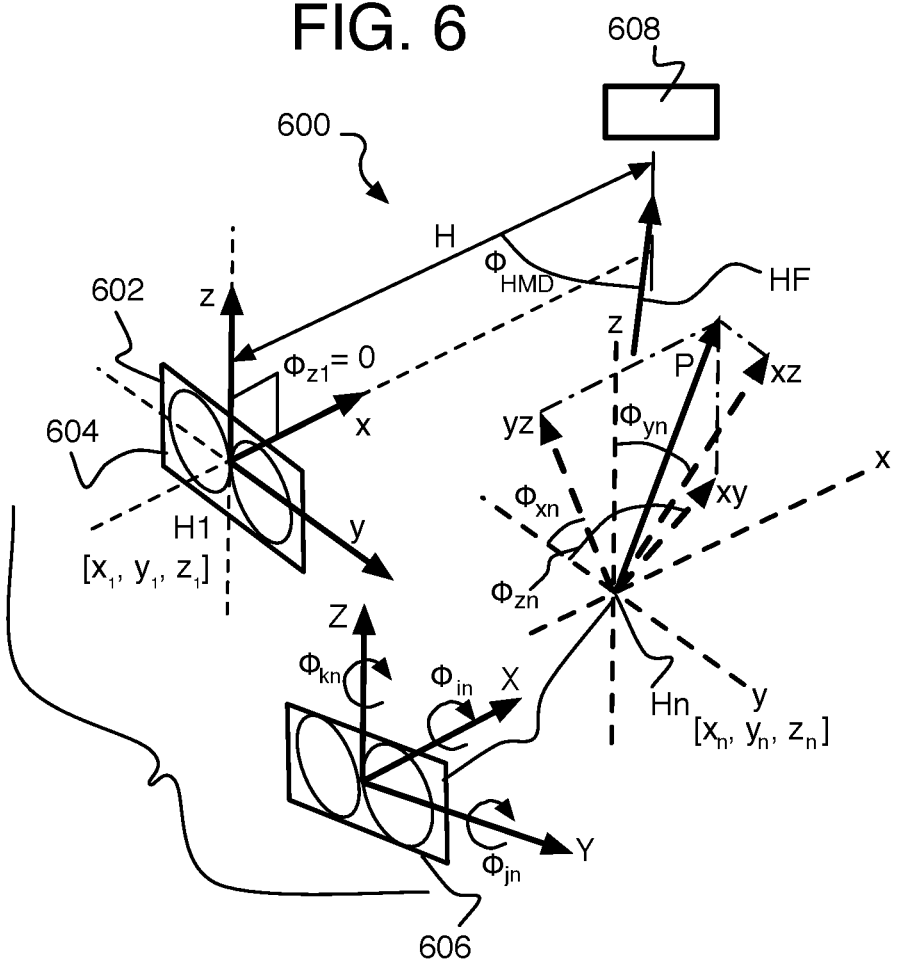
FIG. 6 is a schematic diagram of the example VR/AR head mounted display system arranged to perform a run-time process according to the implementations provided herein.
Figure 7:
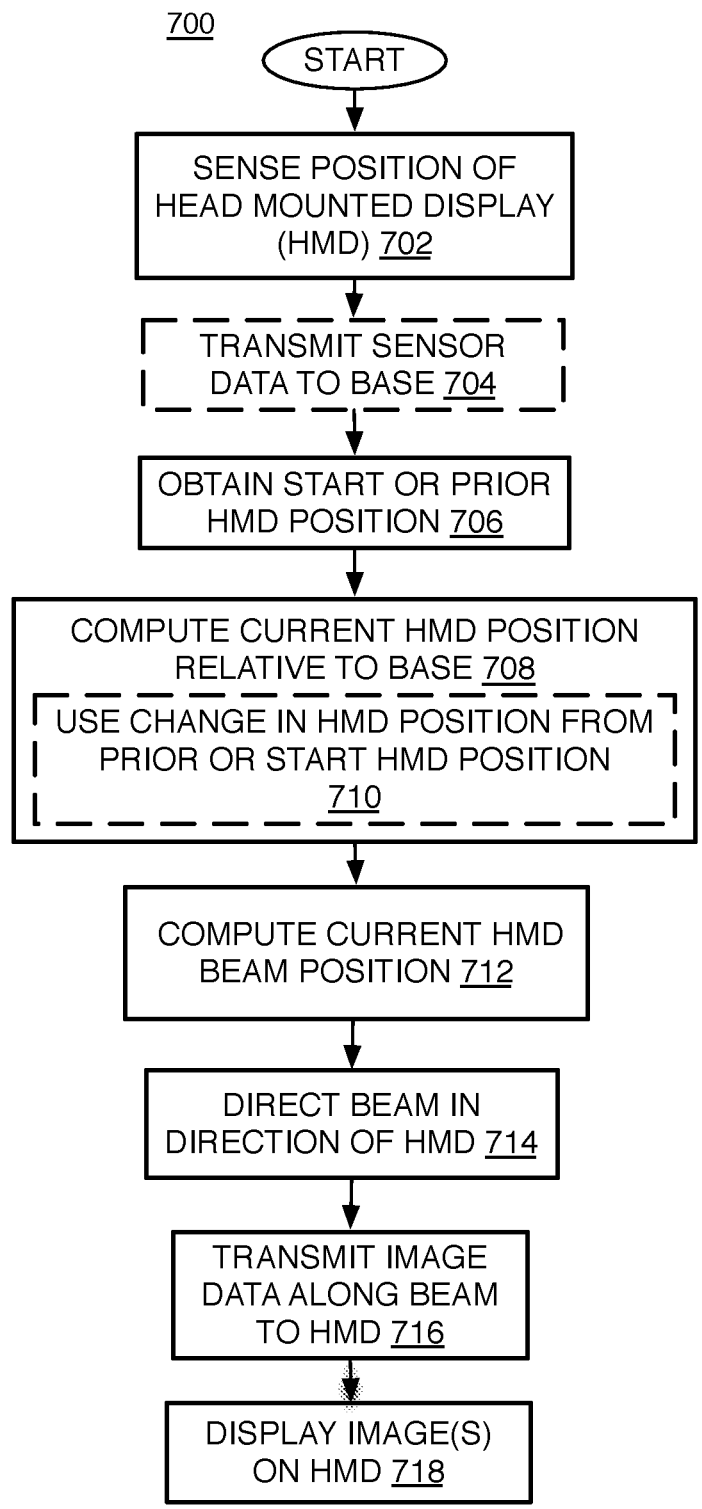
FIG. 7 is a detailed flow chart of a run-time method of wireless data transmission for virtual or augmented reality head mounted displays according to the implementations herein.

Referring now to FIG. 7, by one approach an example process 700 is a computer-implemented method of wireless data transmission for virtual or augmented reality head mounted displays. In the illustrated implementation, process 700 may include one or more operations, functions or actions as illustrated by one or more of operations 702 to 718 numbered evenly. By way of non-limiting example, process 700 may be described herein with reference to example image processing systems 100, 200, 500, 600, 1000, 1100, or 1200 of FIGS. 1-2, 5-6, and 10-12 respectively, and where relevant.

Now during run-time, the user may wear the HMD and move his head which will change the perspectives and position of the image that should be displayed to the user in real-time. The description of the HMD and base is as described above. To provide a radio transmission beam directed from the base and to the HMD to efficiently transmit images from the base to the HMD along the beam position, process 700 may include "sense position of head mounted display (HMD)" 702. This includes sensing a current HMD position in the 3D space of the HMDs and determining coordinates ($x_n$, $y_n$, $z_n$) by using the position sensors as described above.

Optionally, process 700 may include "transmit sensor data to base" 704. Thus, in these arrangements, the HMD may transmit the raw sensor data to the base or other device to compute the current sensed HMD position at the base or other device, or the sensed HMD position ($x_n$, $y_n$, $z_n$) may be computed at the HMD, and the coordinates are transmitted to the base or other device. In either case, the base or other device is then to use the sensed current HMD position to compute a change in position from the start or prior HMD position relative to the base. In alternative cases, some part or all of the computations are performed at the HMD, and the HMD transmits a computed change in HMD position, or final beam position angle, to the base or other image transmitting device for use. This may occur whether or not the HMD transmits the sensor data to the base or other device to generate images to be displayed on the HMD.

Process 700 may include "obtain start or prior HMD position" 706, and particularly, the start or prior position is obtained by whichever device, HMD or base (or other device) that is to determine the difference between the start or prior HMD position and the current HMD position. Also, while the example described herein mainly refers to the arrangement where each or individual current HMD positions are differenced from the designated start HMD position formed during initialization, it will be understood that alternatively, once a current HMD position is established and that is relative to the position of the base and start HMD position, that current HMD position can become a prior HMD position used as a reference for a new current HMD position when the HMD is moved again. Since the position of the prior HMD position is based on the start HMD position, it should have a position sufficiently reliable to be the basis for the next new current HMD position. This may result in a chain or series of HMD positions where each current HMD position relies on the immediately prior, or some other chosen prior, HMD position rather than relying on the start HMD position directly. Such a series, however, may not be as accurate as relying on the start HMD position directly since there are more chances for sensor position and other errors to enter the equations with the series.

Process 700 may include "compute current HMD position relative to base" 708. This may include "use change in HMD position from prior or start HMD position" 710. The generic current HMD position can be defined as $$\text{Cur\_HMD\_Pos}[x,y,z] \quad (7)$$

where in the current example for simplification, $z=0$ when a user wearing an HMD does not change the height of the HMD while the user is moving. Any arbitrary HMD position with respect to the base can now be calculated based on the high precision position data established during the initialization process (or carried forward to a prior HMD position). Assuming the start HMD position is being used here for this example, at each instance the change in position measured in the HMD system can be applied $$\text{BASE\_HMD\_Pos}[x]=\text{HMD\_Position\_One}[x]+ \Delta\text{HMD\_POS}[x] \quad (8)$$

$$\text{BASE\_HMD\_Pos}[y]=\text{HMD\_Position\_One}[y]+ \Delta\text{HMD\_POS}[y] \quad (9)$$

where the start HMD position (or HMD_Position_One) [x, y] are the [$\hat{\ell}$, d] values established during initialization (or values of a prior HMD position in a series based on those initialization values). Thus, the $\Delta$HMD_POS[x] and $\Delta$HMD_POS[y] is the difference between the sensed coordinate values ($x_1-x_n$) and ($y_1-y_n$) respectively. To account for changes in height of the HMD the same process may be applied except with a factor for the z values.

Once the current HMD position relative to the base is known (BASE_HMD_Pos[x] and BASE_HMD_Pos[y], or more generally labeled BASE_HMD_Pos[x, y, z], then process 700 may include "compute current HMD beam position" 712. This may involve computing an angle describing the direct vector from the base to the current HMD position and may be calculated at any instant as:

$$\alpha' = \tan-1\left(\frac{\text{BASE\_HMD\_Pos}[x]}{\text{BASE\_HMD\_Pos}[y]}\right) \quad (10)$$

where the beam position $\alpha'$ angle is that as already described and as shown on FIG. 5, except now being an angle between the distance d line and the current HMD position.

Process 700 may include "direct beam in direction of HMD" 714, where the beamforming or beam control unit then aims the beam along the beam position indicated by the angle $\alpha'$ from the base. The process 700 then may "transmit image data along beam to HMD" 716, and so that he HMD can then "display image(s) on HMD" 718, and as already described with HMD system 200. As mentioned, the transmission may be performed on a short-range radio-based wireless network with high bandwidth and low latency such as WiGig although other network types as mentioned above may be used as well.

Also as mentioned, this is one example algorithm for determining the current HMD position relative to the base and without performing radio-based searches at least during the run-time of the HMD, although it may be used during an initialization stage as described above.

Figure 8:
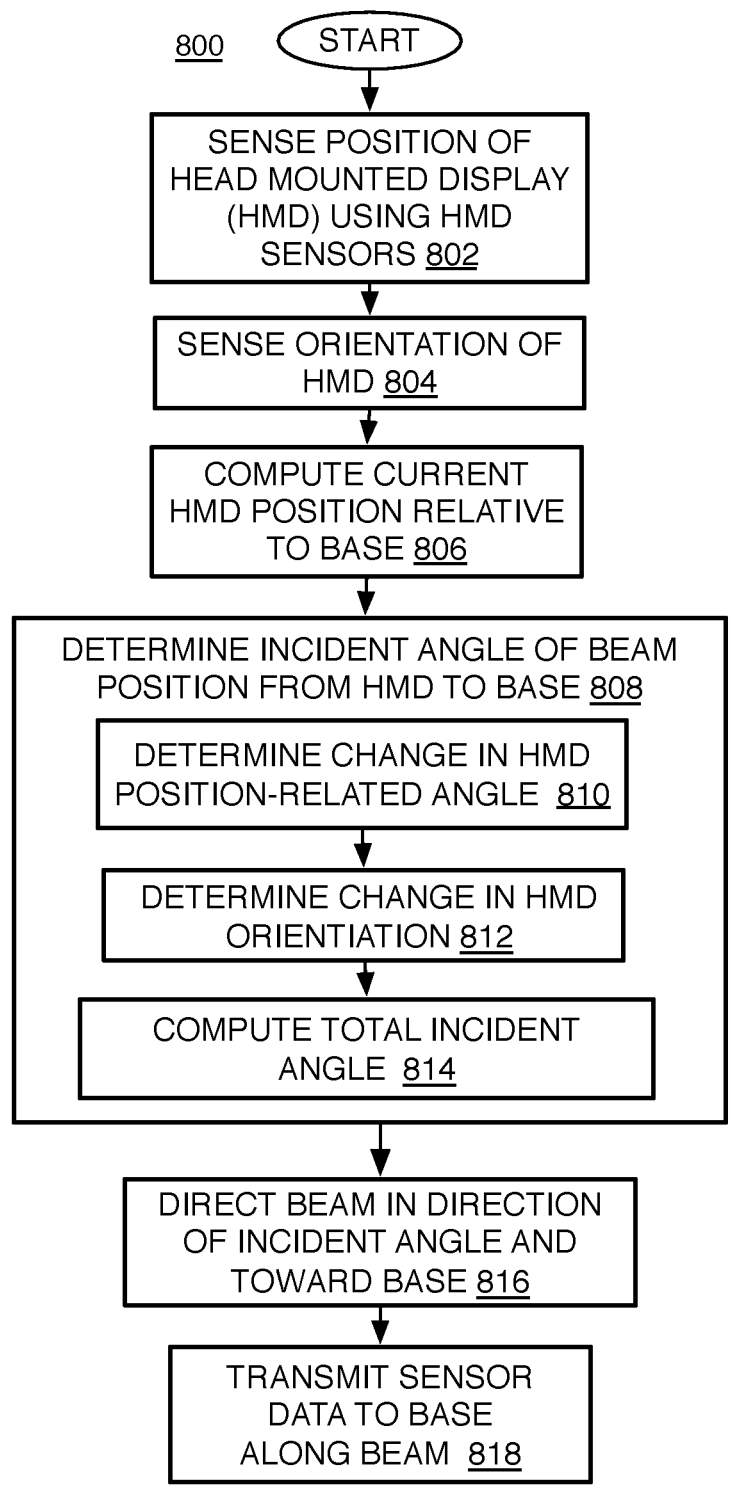
FIG. 8 is a detailed flow chart of another run-time method of wireless data transmission for virtual or augmented reality head mounted displays according to the implementations herein.

Referring to FIG. 8, by one approach an example process 800 is a computer-implemented method of wireless data transmission for virtual or augmented reality head mounted displays. In the illustrated implementation, process 800 may include one or more operations, functions or actions as illustrated by one or more of operations 802 to 818 numbered evenly. By way of non-limiting example, process 800 may be described herein with reference to example image processing systems 100, 200, 500, 600, 1000, 1100, or 1200 of FIGS. 1-2, 5-6, and 10-12 respectively, and where relevant.

Process 800 may include "sense position of head mounted display (HMD) using HMD sensors" 802, and as described above determining the coordinates ($x_n$, $y_n$, $z_n$) of the current sensed HMD position in the 3D HMD space that may or may not yet be relative to the position of the base.

Process 800 may include "sense orientation of HMD" 804. Here, the sensed orientation of the HMD is obtained in the three degrees of freedom ($i_n$, $j_n$, $k_n$) respectively about the X, Y, and Z axes of the HMD as described above. As mentioned, the head tracking sensors are typically on the HMD but may be at least partly on the base or other location external to the HMD depending on the type of sensor that is being used.

Process 800 may include "compute current HMD position relative to base" 806, and as provided by process 700 to establish the spatial relationship between the HMD and the base, and that may be used to provide a beam position to transmit image data from the base to the HMD to display the images. The result is (x, y, z) or ($\vec{\ell}$, d) coordinates of the current HMD position that are relative to the (0, 0, 0) position at the base.

Process 800 may include "determine incident angle of beam position from HMD to base" 808. Specifically, once the spatial relationship between the HMD and the base is established, the system may determine the incident angle of the transmission beam position extending from the base and to the current HMD position. As discussed above, this may refer to precisely extending between antennas or other anchor positions of the base and HMD. This incident angle $\Phi_{HMD}$ also defines the beam transmission angle required by the HMD to send information back to the base. Two angular components exist to determine the incident angle, (1) the change in angle due to the change in the spatial relationship between the base and the HMD, and (2) the change in the HMD orientation angle at the current HMD position compared to the orientation of the HMD at the start HMD position. The example computation of each of these two incident angle components are explained in turn.

The first component of the incident angle is the angle formed between the initial beam position (or line) extending from the base and the HMD on one side, and the line extending from the base and the current HMD position assuming no HMD rotation from the start HMD Position to the current HMD position. Given coordinates from the HMD system, the system can apply known trigonometric relationships to determine this value. Thus, process 800 may include "determine change in HMD position-related angle" 810. By one example and as described above, the distance H between the HMD and base at the start HMD position, and along the established initial beam position α' is:

$$H=|HMD\_Position\_One|=|[\vec{\ell},d]| \quad (11)$$

as described above when assuming no change in height z, or could be designated |[| $\ell$ |, d, z]| when constant height is not assumed.

Referring to FIG. 6 for this example, a separate coordinate system is created to determine the position-related component of the incident angle, and system 600 is provided to exemplify this separate coordinate system. The HMD 602 is shown at the start HMD position H1 (604) and may be moved to another or current HMD position Hn (606) during run-time and in front of a base 608 as described above. The start HMD position also is generated during an initialization stage also as described above.

Here, a separate coordinate system is established with the x-axis running down the initial beam position H. With the initial beam position H set as the x-axis, the y and z-axis extend in perpendicular directions from the initial beam position (x-axis) H as shown. Since the start HMD position is on the H (the x-axis), y=0 and z was assumed to be 0 as well. Thus, the initial point (or start HMD point) may be written as:

$$HMD\_Angle1\_Pos=[H,0,0] \quad (12)$$

The difference between the (x, y, z) coordinates of the start HMD position and the current HMD position, and being those coordinates relative to the base, can be differenced to determine changes in each of the x, y, and z directions as ΔHMD_POS[x], ΔHMD_POS[y], and ΔHMD_POS[z], and the HMD Position Angle at any instance is defined as:

$$HMD\_Anglen\_Pos=[H+\Delta VR\_POS[x],\Delta VR\_POS[y],\Delta VR\_POS[z]] \quad (13)$$

Once the current HMD Position with respect to the base is known the angular position sub-components are calculated as:

$$\Phi_{zn} = \tan^{-1}\left(\frac{H + \Delta HMD\_POS[x]}{\Delta HMD\_POS[y]}\right) \quad (14)$$

$$\Phi_{xn} = \tan^{-1}\left(\frac{\Delta HMD\_POS[y]}{\Delta HMD\_POS[z]}\right) \quad (15)$$

$$\Phi_{yn} = \tan^{-1}\left(\frac{H + \Delta HMD\_POS[x]}{\Delta HMD\_POS[z]}\right) \quad (16)$$

where each angle represents a sub-component of the position component P that is part of the incident angle. There are a number of ways to describe these sub-components. One way is to state that each sub component $\Phi_{xn}$, $\Phi_{yn}$, and $\Phi_{zn}$ extends between an axis and the projected vector in one of the planes formed by the axes, and its angle is relative to rotation about the third axis. For example, $\Phi_{zn}$ refers to the sub-component vector xy of the position component P and has its angle measured around the z axis, and extends in an xy plane as shown on system 600. Likewise, $\Phi_{xn}$ has a sub-component vector yz that extends in the yz plane and has its angle measured about the x axis, while $\Phi_{yn}$ has a sub-component vector xz that extends in an xz plane and has its angle measured about the y axis as shown on system 600. The sub-component angles $\Phi_{xn}$, $\Phi_{yn}$, and $\Phi_{zn}$ can then be input to a total incident angle equation (18) described below.

Turning to the orientation component of the incident angle, process 800 then may include "determine change in HMD orientation" 812, which is performed to determine the relative rotation of the HMD $\Phi_{\Phi n}$ about its own XYZ axes and change in orientation from the start HMD position orientation ($i_1$, $j_1$, $k_1$) to the current HMD position orientation ($i_n$, $j_n$, $k_n$), as shown on system 600, and is simply the change in rotation about each axis as measure by the HMD system:

$$\Phi_{\Phi n}=[\Delta HMD\_Angle[i],\Delta HMD\_Angle[j],\Delta HMD\_Angle[k]] \quad (17)$$

where $\Delta HMD\_Angle[i]=i_1-1_n$, $\Delta HMD\_Angle[j]=j_1-j_n$, and $\Delta HMD\_Angle[k]=k_1-k_n$.

Process 800 may include "compute total incident angle" 814. The incident angle or net angular displacement of the HMD which defines the required angle for the HMD radio or transmitter to transmit data from the HMD and to the base is computed as:

$$\Phi_{HMD}=[\Phi_{\Phi n}[0]+\Phi_{xn},\Phi_{\Phi n}[1]+\Phi_{yn},\Phi_{\Phi n}[2]+\Phi_{zn}] \quad (18)$$

resulting in a final beam position HF for transmitting sensor and other data from the HMD to the base at an incident angle $\Phi_{HMD}$ from initial beam position H. As mentioned above, instead of determining the current beam position HF based directly from initial beam position H at start HMD position, a prior position already having its position relative to the base and its beam position determined could be differenced from the current HMD position data to determine the current HMD beam positions instead resulting in a series or chain of such computations as described above.

Process 800 may include "direct beam in direction of incident angle and toward base" 816, where the beamforming or beam control unit on the HMD may direct the beam to the base, and process 800 may include "transmit sensor data to base along beam" 818, and as described in detail above. Also as mentioned, this operation may involve steering the antenna at the HMD to provide a transmitting beam position, but could alternatively or additionally include steering the antenna at the base to form a receiving beam position.

Figure 9:
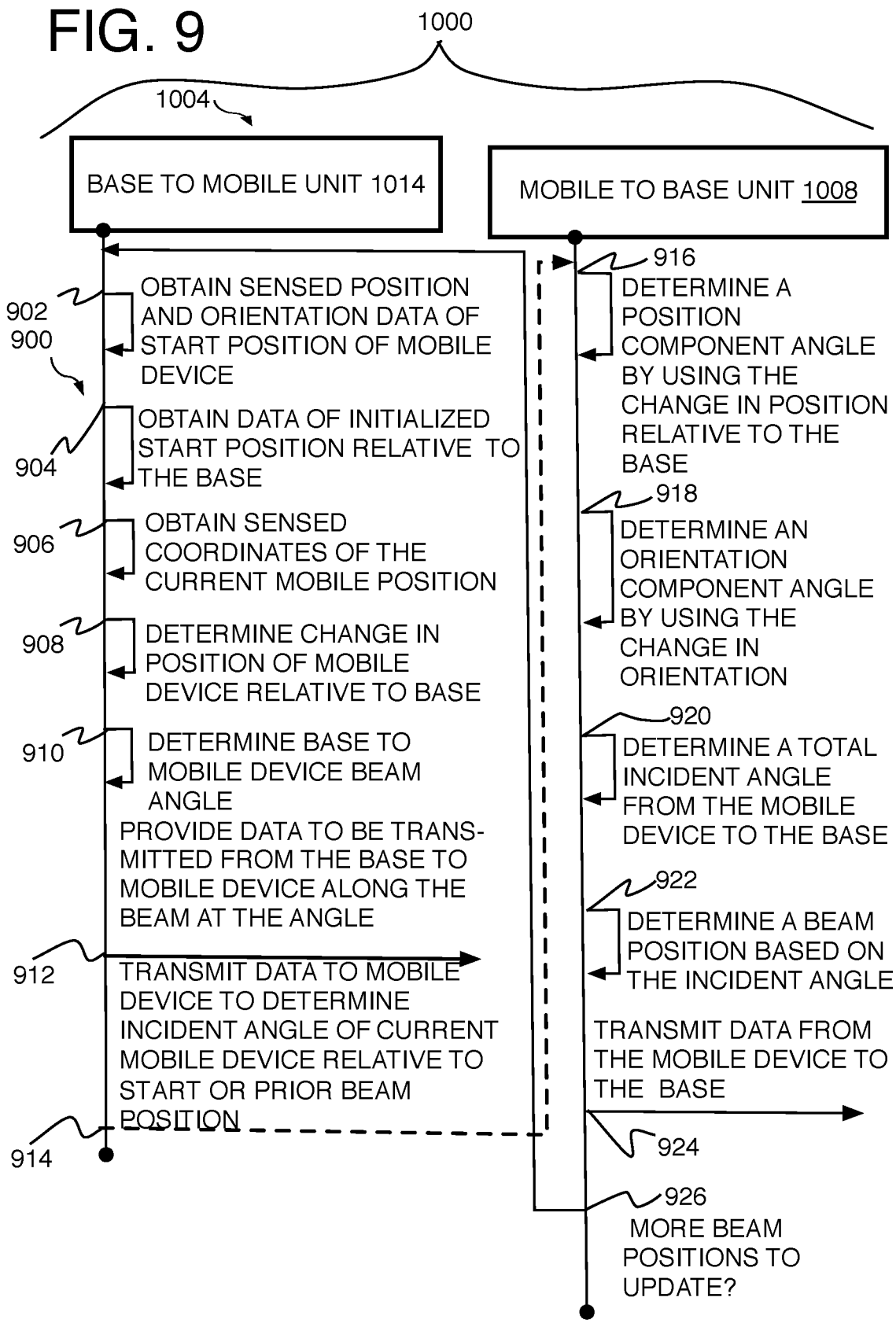
FIG. 9 is a diagram of an operation of an example system described herein.

Referring to FIG. 9, process 900 illustrates the operation of a sample image processing system 900 that performs a method of providing data from a remote base to a mobile device that displays images in real-time. In more detail, in the illustrated form, process 900 may include one or more operations, functions or actions as illustrated by one or more of actions 902 to 926 numbered evenly. By way of non-limiting example, process 900 will be described herein with reference to FIG. 10. Specifically, system 1000 includes logic units 1004 that have a real-time radio transmission beam direction control unit 1012. This unit may have a base to mobile unit 1014 and a mobile to base unit 1020 that each determine a beam position between a base and a mobile device. One example of a mobile device is an HMD that receives real-time image data from the base and transmits information, such as sensor data form the mobile device to the base. The run-time operation of such a system may proceed as follows.

The process 900 may include "obtain sensed position and orientation data of start position of mobile device" 902, and where the mobile device may be an HMD with sensors as explained above, but could be other devices that display image data such as a smartphone to name one example. By one form, such a smartphone is placed in headgear to form the display of an HMD. The sensors such as accelerometers, gyroscope, IMUs, optical projectors and receptors, RGBD cameras, and so forth described above may be used to compute an (x, y, z) position of the mobile device as well as the (i, j, k) orientation in degrees about the XYZ axes of the mobile device and from a zero orientation as described above. At this point, the (x, y, z) coordinates are likely to be relative to a 3D space of the mobile device without an association to the position of the base. Also as mentioned, some or all of these sensor devices may be on the mobile device, on the base, both, some other location external to the mobile device and base, or any combination of these.

This operation also refers to receiving data after an initialization stage. During the initialization stage, radio-based transmission beams may be established between the mobile device and a base that has an antenna and beam-forming ability, and can steer the beam toward the mobile device. The transmission may be formed on a high bandwidth, low latency network, and by one example, a short-range wireless network such as WiGig. The mobile device may be moved to at least two positions where one of the positions is considered the start position. The angle of the established beam from the base to the mobile devices will be known by the base. With these angles and the sensed 3D locations of the two mobile device positions, the distance between the two mobile device positions can be determined, and the position of the base relative to the start position can be computed, and by triangulation in one example. This provides a sufficiently precise location of the start position relative to the base and in 3D space that may not be attainable with sensors alone. Thus, process 900 also may include "obtain data of initialized start position relative to the base" 904.

The process 900 may include "obtain sensed coordinates of the current mobile position" 906, and as explained above, during the run-time of the mobile device while a user is viewing images on the mobile device for example, the sensors also provide the (x, y, z) coordinates and (i, j, k) orientation of the mobile device at the current position. The details are explained above.

The process 900 may include "determine change in position of mobile device relative to base" 908. Here, the difference between the start and current sensed positions is determined for each x, y, z direction. Alternatively, the current position may be differenced from a prior position of the mobile device whether the immediate prior position or some other designated prior position in a series of mobile device positions, and where each mobile device position that is to be relied upon to determine a current mobile device position relative to the base has a position determined relative to the start position. The change in position is added to the start or prior position being relied on to determine the current position of the mobile device.

The computations here may be performed at the base or other remote electronic device or computer, and that transmits the results to the base or mobile device. For the base example, the mobile device transmits sensor data to the base for computations over a short range wireless network such as WiGig, and the computations for change in position take place at the base. The base then uses the change to compute the beam angle where process 900 includes "determine base to mobile device beam angle" 910. By one example, this is by using trigonometric equation (10) described above.

By other alternatives, the change in position relative to the base as well as the beam angle could be computed at the mobile device (or another remote device) and then just the beam angle (or beam position) may be transmitted to the base for directing the beam from the base to the mobile device.

The process 900 then may include "provide data to be transmitted from the base to mobile device" 912, and this may include providing image data to be displayed at the mobile device and to perform whatever operations are needed to perform the transmission of the image to the mobile device, such as encoding of the data.

To establish a transmission beam from the mobile device to the base in order to transmit sensor data to the base for the computations performed at the base mentioned above, the process 900 may include "transmit data to mobile device to determine incident angle of current mobile device relative to start or prior beam position" 914. As described above, the incident angle is the angle from the initial beam position to a beam position directed from the current position of the mobile device to the base. The data to be transmitted to the mobile device may include the computed change in position. The current sensed orientation data may be transmitted as well when the sensed orientation is not computed at the mobile device itself. This transmission is performed when the mobile device is to compute the beam position to transmit sensor data to the base.

Alternatively, however, the transmission may be omitted when the incident angle is computed at the base instead. In this case, just the incident angle may be transmitted from the base and to the mobile device for the mobile device to set the beam position for the sensor data transmission. By yet another alternative, no transmission is needed when the base steers the radio beam to a receiving radio beam position to receive the sensor data from the mobile device. Other variations may be applied as well as long as radio-based searches are not used to set beam position for data transmission after the initialization stage and until the setting of the start position of the mobile device relative to the base is to be refreshed or recomputed.

The process 900 may include "determine a position component angle using the change in position relative to the base" 916, and by one example, this includes setting the beam position from the base to the start position of the mobile device as the x-axis of a new xyz coordinate system. The system then determines the current position of the mobile device on this new coordinate system using the difference in sensed position from the start position to the current position. Trigonometric equations can then be used to determine x, y, and z sub-component angles of the difference in angle from the initial beam position (at the start mobile device position) to a line from the base to the current HMD position, and which is the position component angle of the incident angle. Each sub-component refers to an angle about the referenced axis (x, y, or z) and in the plane of the other two axes. The details are explained above. It also will be appreciated that instead of using the initial angle, the incident angle could be established as a difference to any other prior beam position established with sufficient accuracy whether during an initialization period or as a refresh of the initial beam position, and whether or not established by radio-based transmission beam steering search or by sensors, when sufficiently precise.

The process 900 may include "determine an orientation component angle by using the change in orientation" 918. Here, the (i, j, k) orientations of the mobile device at the current position and the start (or prior) position are differenced with each sub-component referencing the same angle being subtracted (e.g., $i_1 - i_n$ where both are about the x-axis).

The process 900 may include "determine a total incident angle from the mobile device to the base" 920, and as described above for equation (18), where the position component and orientation component about the same axis are added together to determine a total incident angle in degrees about each axis.

The process 900 may include "determine a beam position based on the incident angle" 922, and the system then sets the beam position to transmit sensor or other data from the mobile device to the base along a line at the incident angle from the initial (or prior) beam position. Other details are provided above.

The process 900 may include "transmit data from the mobile device to the base" 924, where the mobile device transmits the data over a short-range, high bandwidth, low latency wireless network such as WiGig by one example, although other wireless networks could be used here as well.

The process 900 may include the query "more beam positions to update?" 926, and if so the process loops back to operation 902 to sense the new current mobile device position. This may be triggered by motion of the mobile device, or may be performed at certain time intervals whether or not the mobile device has been moved.

It will be appreciated that the processes 300, 400, 700, 800, and 900 respectively explained with FIGS. 3-4 and 7-9 do not necessarily need to be performed in the order shown, nor with all of the operations shown. It will be understood that some operations may be skipped or performed in different orders.

Also, any one or more of the operations of FIGS. 3-4 and 7-9 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 10:
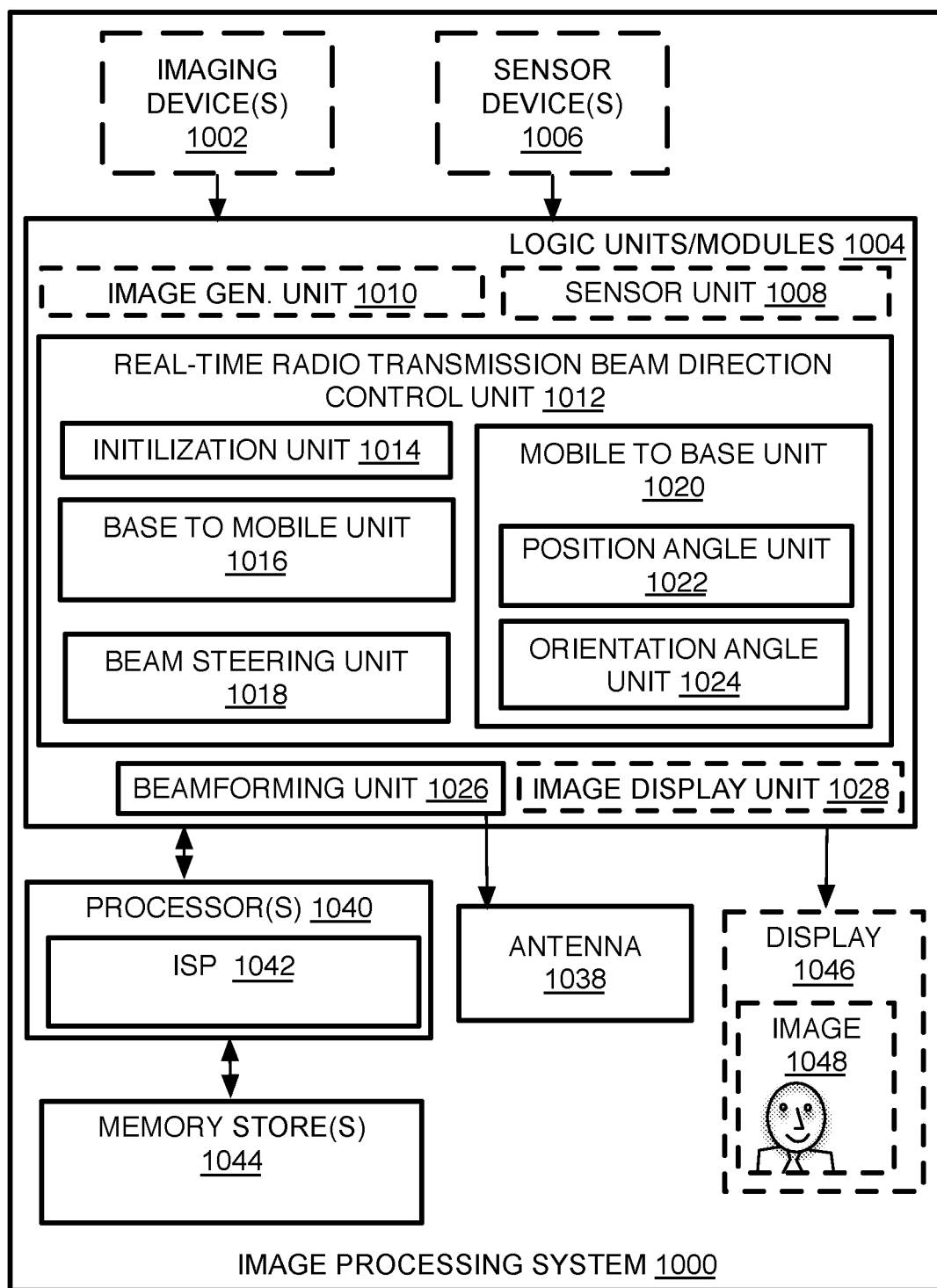
FIG. 10 is an illustrative diagram of an example system.

Referring to FIG. 10, an example image processing system 1000 is arranged in accordance with at least some implementations of the present disclosure. In various implementations, the example image processing system 1000 may perform many of the functions of determining radio transmission beam positions described above. Thus, system 1000 may be the mobile device such as an HMD, the base wirelessly communicating with the mobile device, both (where one system 1000 may be the mobile device and another system 1000 may be the base), or some other electronic device communicating with the mobile device and/or the base. When the system 1000 is the mobile device, the system 1000 has at least those units shown to receive image data and transmit sensor data. Thus, in addition to the HMD, the system 1000 may be a multi-function device such as a smartphone, smart glasses, tablet, and so forth.

When the system 1000 is the base, the system 1000 has at least those units shown for transmitting image data and receiving sensor data from a mobile device. In these cases, the system 1000, or at least the part of the image processing system 1000 that holds logic units 1004 that performs beam position computations, may be a desktop or laptop computer, smartphone, tablet, or other device. It also could be or have a fixed function device such as a set top box (cable box or satellite box), game box, or a television.

When the system 1000 is some other electronic device, the system 1000, or at least the logic units 1004 of system 1000, may perform the beam forming computations for the mobile device, the base, or both. In this example case, the system 1000 may wirelessly (or by wire) communicate data to the mobile device or base but is not by the same wireless network used between the base and mobile device that uses radio transmission beam steering. By alternative approaches, the system 1000 could still have this capability. In these cases, the system 1000 may be a remote server, computer, laptop, or one of the sensors used by the base or mobile device such as a digital camera whether a dedicated camera or a camera on a multi-function device.

Otherwise, when the system 1000 is not itself a camera, the system 1000 may be considered to have imaging device(s) 1002. In any of these cases, such technology may include a camera such as a digital camera system, a dedicated camera device, web cam, or any other device with a camera to be an external still or video camera capturing the user wearing the mobile device and the area around the user for example, or capturing the environment surrounding the mobile device when such a camera is on the mobile device. The camera may be an RGB camera or an RGB-D camera, but could be a YUV camera. The internal camera may be an RGB or YUV color camera, monochrome camera, or an IR camera with a projector and sensor. Thus, in one form, image processing system 1000 may include the imaging device(s) 1002 and that has camera hardware, camera software, units, modules, components, and optics including one or more sensors as well as auto-focus, zoom, aperture, ND-filter, auto-exposure, flash, actuator controls, and so forth. In other cases, the imaging device(s) 1002 may be considered physically remote from the rest of the image processing system 1000, and may be wirelessly communicating, or wired to communicate, image data to the logic units 1004. In this form, logic modules 1004 may communicate remotely with, or otherwise may be communicatively coupled to, the imaging device 1002 for further processing of the image data.

The system 1000 also may have other sensor device(s) 1006 which may include those sensors at the mobile device, base, or other electronic device processing data to determine beam positions, or may be remote from any of these when the sensor is self-contained. When the mobile device is an HMD the sensor data may be used to determine the perspective of the images to be displayed on the HMD as well. Such sensors may include one or more gyroscopes, accelerometers, IMUs, GPSs, optical projector systems such whether IR, RGB, or other light technology, and so forth.

The logic modules 1004 of the image processing system 1000 may have a sensor unit 1008 that receives sensor data, which may or may not be raw sensor data, and may process the sensor data into a format expected for image processing and/or generation as well as beam position computations. An image generation unit 1010 may use the sensor data to process captured images to create a 3D model or generate animated images. Thus, the image generation unit 1010 may perform pre-processing, decoding, encoding, and/or even post-processing to prepare the image data for transmission, storage, and/or display.

In the illustrated example, the logic modules 1004 also may include a real-time radio transmission beam direction control unit 1012. The control unit 1012 may have an initialization unit 1014, base to mobile unit 1016, beam steering unit 1018, and a mobile to base unit 1020 which includes a position angle unit 1022 and an orientation angle unit 1024. These units may be used to determine a beam position and have similar functions as those units described above with similar titles such as those on system 200. The logic units 1004 also may have a beamforming unit 1026 to direct the beam and image display unit 1028 that controls the display at least when the system 1000 is, or has, a mobile device.

These units may be operated by, or even entirely or partially located at, one or more processor(s) 1040, and which may include an image signal processor (ISP) 1042 to perform many of the operations mentioned herein. The image signal processor (ISP) 1042 may be an Intel Atom by one example. The system 1000 also may have memory stores 1044 which may be RAM, DRAM, DDR RAM, cache, or other memory types, and which may or may not hold the image data and statistics as well as the logic units mentioned above. The system 1000 also may have at least one antenna 1038 that is steerable for beamforming as described above, and one or more antennas may be provided whether the system 1000 is a mobile device, a base, or other device mentioned above. The antenna may be used to transmit and/or receive sensor data, image data, or overhead data, or other data. The sensors may use these antennas or may use other antennas to perform sensing operations.

In one example implementation, the image processing system 1000 may have a display 1046, which may or may not be one or more displays on the HMD, at least one of the processor(s) 1040 communicatively coupled to the display, and at least one memory 1044 communicatively coupled to the processor to perform the operations described herein as explained above. The image generation unit 1010, which may have an encoder and decoder, and antenna 1038 may be provided to transmit compressed image date to and from other devices that may display or store the images. This may refer to transmission of image data between the base and the mobile device no matter which of the devices has the logic units 1004. Otherwise, the processed image 1048 may be displayed on the display 1046 or stored in memory 1044. As illustrated, any of these components may be capable of communication with one another and/or communication with portions of logic modules 1004 and/or imaging device 1002. Thus, processors 1040 may be communicatively coupled to both the image device 1002 and the logic modules 1004 for operating those components. By one approach, although image processing system 1000, as shown in FIG. 10, may include one particular set of unit or actions associated with particular components or modules, these units or actions may be associated with different components or modules than the particular component or module illustrated here.

Figure 11:
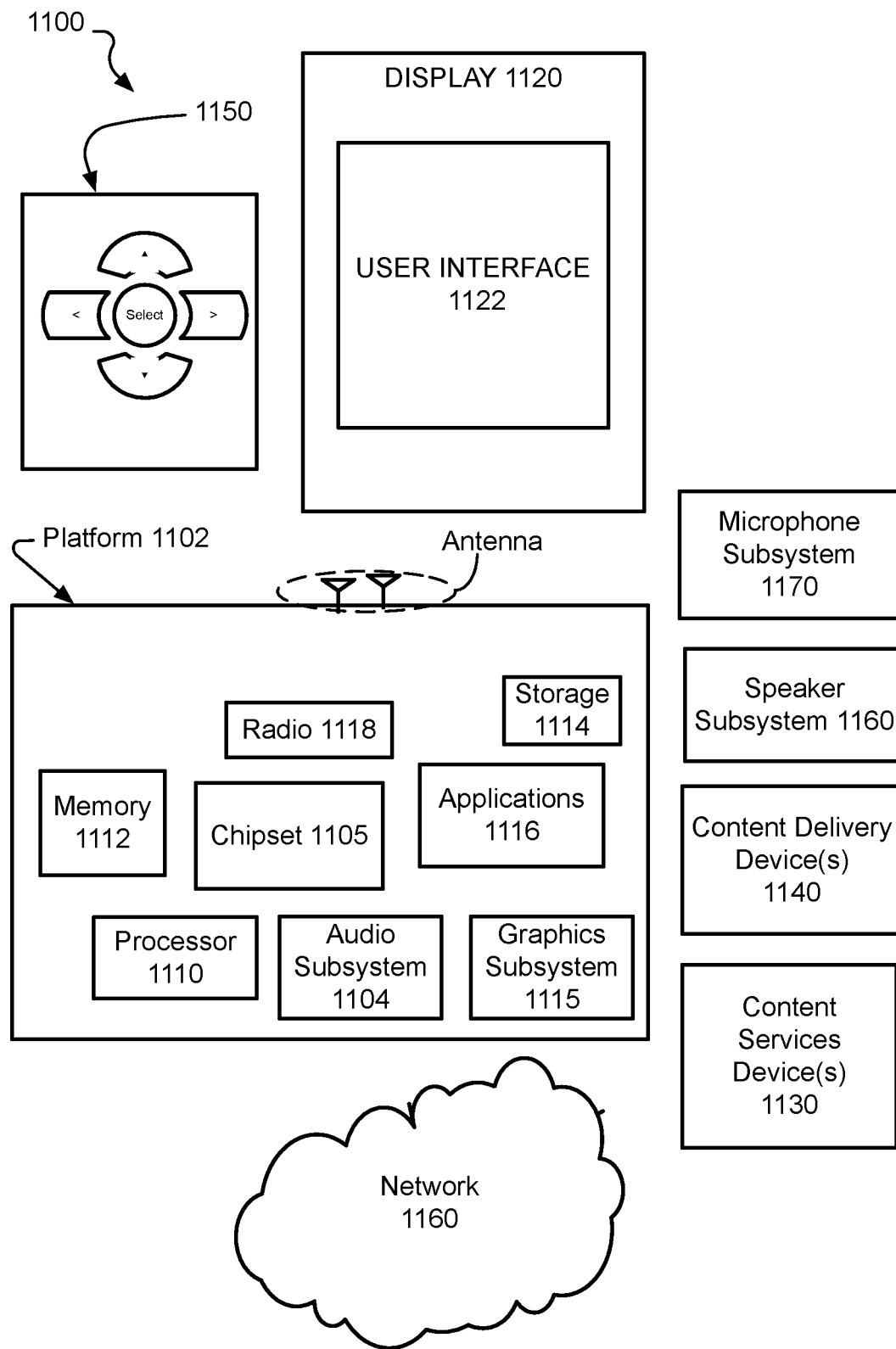
FIG. 11 is an illustrative diagram of another example system.

Referring to FIG. 11, an example system 1100 in accordance with the present disclosure operates one or more aspects of the image processing system described herein. It will be understood from the nature of the system components described below that such components may be associated with, or used to operate, certain part or parts of the image processing systems described above including performance of a mobile device such as an HMD or other mobile device with a display for virtual or augmented reality generation for example, and/or operation of the base described above. In various implementations, system 1100 may be a media system although system 1100 is not limited to this context. For example, system 1100 may be incorporated into a digital video camera, mobile device with camera or video functions such as an imaging phone, webcam, personal computer (PC), remote server, laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1100 includes a platform 1102 coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, Display Port, wireless HDMI, and/or wireless HD compliant techniques. Graphics subsystem 1115 may be integrated into processor 1110 or chipset 1105. In some implementations, graphics subsystem 1115 may be a stand-alone card communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), personal area networks (PANs), cellular networks, and satellite networks. In communicating across such networks, radio 1118 may operate in accordance with one or more applicable standards in any version, and may be operated in conjunction with the antenna described below.

In various implementations, display 1120 may include any television type monitor or display. Display 1120 may include, for example, a computer display screen, touch screen display, video monitor, television-like device, and/or a television. Display 1120 may be digital and/or analog. The display 1120 also may be a display on an HMD as described above. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of unidirectionally or bidirectionally communicating content between content providers and platform 1102 and/display 1120, via network 1160 or directly. It will be appreciated that the content may be communicated unidirectionally and/or bidirectionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of controller 1150 may be used to interact with user interface 1122, for example. In implementations, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In implementations, controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various implementations, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various implementations, system 1100 may be implemented as a wireless system, but also may include wired systems. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 11.

Figure 12:
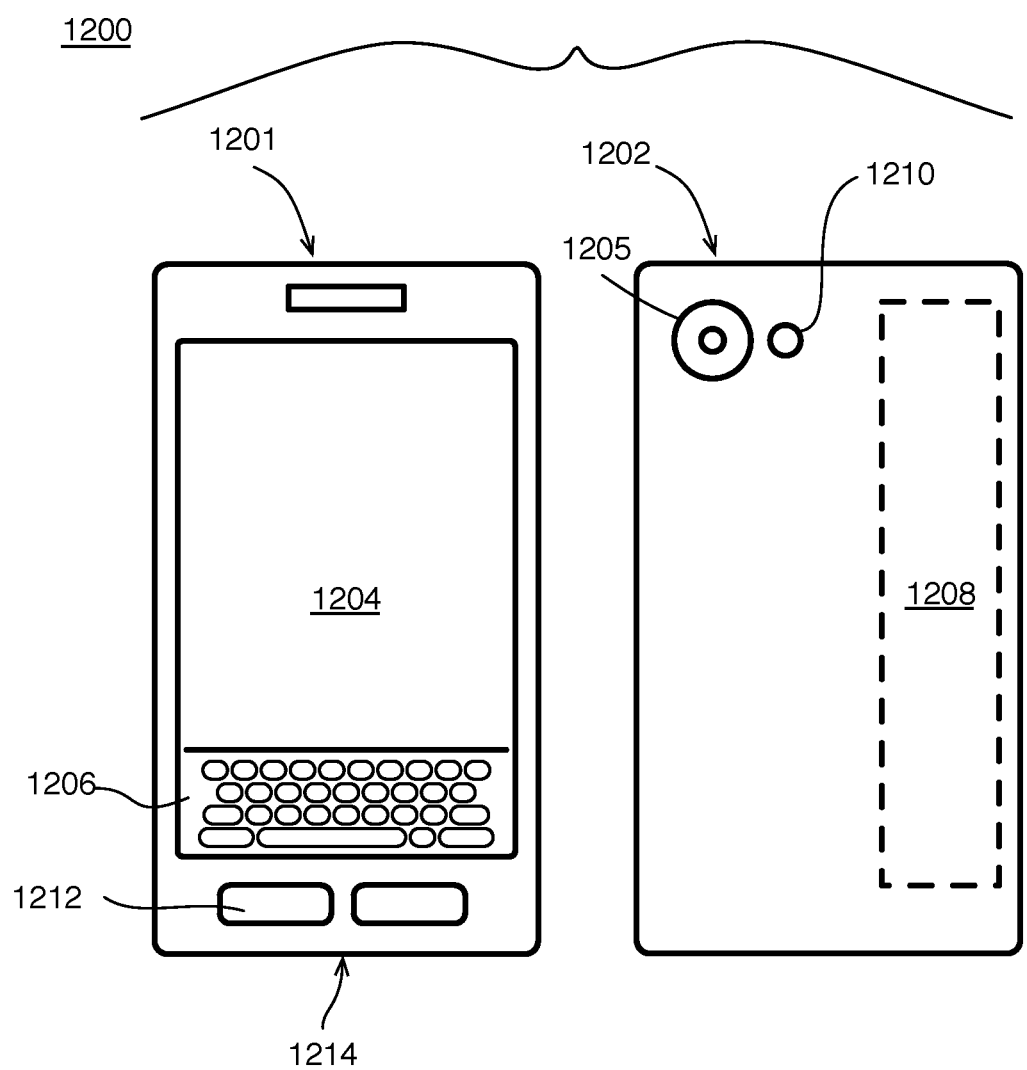
FIG. 12 illustrates another example device, all arranged in accordance with at least some implementations of the present disclosure.

Referring to FIG. 12, a small form factor device 1200 is one example of the varying physical styles or form factors in which systems 1000 or 1100 may be embodied. By this approach, device 1200 may be implemented as a mobile computing device having wireless capabilities, and by one example, could be used as a screen in an HMD. A mobile computing device may refer to any device having a processing system and a mobile power source or supply, such as one or more batteries, for example.

As described above, examples of a mobile computing device may include an a CR or AR HMD, as well as a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The implementations are not limited in this context.

As shown in FIG. 12, device 1200 may include a housing with a front 1201 and a back 1202. Device 1200 includes a display 1204, an input/output (I/O) device 1206, and an integrated antenna 1208. Device 1200 also may include navigation features 1212. I/O device 1206 may include any suitable I/O device for entering information into a mobile computing device. Examples for I/O device 1206 may include an alphanumeric keyboard, a numeric keypad, a touch pad, input keys, buttons, switches, microphones, speakers, voice recognition device and software, and so forth. Information also may be entered into device 1200 by way of microphone 1214, or may be digitized by a voice recognition device. As shown, device 1200 may include a camera 1205 (e.g., including at least one lens, aperture, and imaging sensor) and a flash 1210 integrated into back 1202 (or elsewhere) of device 1200. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example, a computer-implemented method of image processing comprises obtaining image sensing a 3D position of at least one head mounted display (HMD) arranged to display video sequences to a person, determining the location of the sensed 3D HMD position relative to a base, wherein the sensing and determining is performed with other than a radio-based search; determining a beam position of a wireless radio-based transmission beam by using the 3D HMD position; and wirelessly transmitting images from the base and directed toward the HMD along the beam position to display the images to the person at the HMD.

By another implementation, the method may include that the 3D HMD position is a start HMD position, the method comprising: moving the HMD to at least one subsequent current HMD position from the start HMD position causing a change in HMD position; determining the measure of the change in HMD position so that the current HMD position indicates a position relative to the base; determining an updated beam position directed to the current HMD position by using the measure of the change in HMD position. sensing a series of changes from prior HMD positions to multiple current HMD positions; determining the HMD position of individual ones of the current HMD positions and relative to the start HMD position to update the beam position directed to the individual current HMD positions; sensing a series of changes from prior HMD positions to multiple current HMD positions; determining the HMD position of an individual one of the current HMD positions relative to a prior HMD position in the series and to update the beam position directed to the individual one current HMD position; determining a first beam position while the HMD is held in a first location; determining the position of the HMD and relative to the first beam position; moving the HMD to at least one other position; determining the position of the beam at the other position(s); and using at least two of the beam positions and the sensed HMD positions to triangulate a position of the base relative to the HMD at the first location before using sensor data to determine the position of the beam at additional HMD positions. The method including that the sensors for locating the 3D position of the HMD are on the HMD or at least some of the sensors for locating the 3D position of the HMD are on the base or on both the HMD and the base.

The method also comprising transmitting sensor data from sensors and to the base to be used to compute, at the base, the 3D HMD position and the beam position, wherein at least some of the sensors used to compute the 3D HMD position are on the HMD and generate sensor data at the HMD, the method comprising computing at the HMD, both the 3D position of the HMD and a beam position to transmit the sensor data from the HMD to the base. The method also comprises generating the image with a perspective that corresponds to the location and orientation of the HMD by using sensor data also used to determine the 3D HMD position; the method comprising at least one of: (1) wherein a beam position is determined using non-radio-based search sensors each time the HMD is moved a predetermined minimum amount, and (2) wherein a beam position is determined using non-radio-based search sensors each predetermined time interval regardless of the motion of the HMD. The method may comprise wherein a wireless network forming the transmissions has a frequency band and bandwidth sufficient to provide video images on the HMD and perceived to be in near real-time without substantial delay noticeable to a user and while the HMD is moving, wherein the network is WiGig.

By one approach, a head mounted display comprises a body; at least one sensor at the body and to sense a 3D HMD position of the head mounted display (HMD); a beam direction generation unit to determine a beam position by determining the location of the 3D HMD position relative to a base, wherein the sensor and beam direction generation unit respectively sense and determine the location of the 3D HMD by performing other than a radio-based search; a receiver to wirelessly receive transmitted images along a wireless radio-based transmission beam aimed toward the receiver along the beam position; and a display at the body to display the images at the HMD and to a person wearing the HMD.

By another form, the head mounted display includes wherein the beam position is established at the base; the beam generation unit to use the 3D HMD position to determine a second beam position aimed from the HMD and toward the base; and a transmitter to transmit sensor data of the at least one sensor along a beam at the second beam position and to the base, wherein the beam generation unit to generate an incident angle comprising factoring (1) a position angle measuring a change in angle relative to the base from a prior HMD position to a subsequent HMD position, and (2) an orientation angle measuring the change in orientation of the HMD in the prior HMD position and in the subsequent HMD position; and directing the second beam position along the incident angle.

By one form, a computer-implemented system comprises a head mounted display (HMD) having a body and a display on the body to display images at the HMD and to a person wearing the HMD; a base remote from the HMD and having a transmitter for wirelessly transmitting images to the HMD along a radio-based transmission beam aimed at the HMD; at least one sensor at or communicating with the HMD, base, or both to sense a 3D HMD position or orientation or both of the head mounted display (HMD) and at least when the HMD has been moved; a beam generating unit at the HMD or base or both and that uses the 3D HMD position to determine a position of the beam to extend between the base and the HMD, wherein the sensing and determining is performed by other than a radio-based search.

By yet another implementation, the computer-implemented system comprises wherein the HMD comprises: a beam generating unit to determine the position of a second beam position without the use of a radio-based search; and a transmitter to transmit the sensor data to the HMD along the second beam position. The beam generation unit is to: determine an incident angle factoring a change in angle associated with a change in HMD position and a change in orientation between the HMD at the prior HMD position and the at least one subsequent HMD position; and direct the second beam position along the incident angle toward the base, wherein a wireless network forming the transmission and beam is a network with at least the transmission bandwidth of WiGig.

By one approach, at least one computer readable article comprises a plurality of instructions that in response to being executed on a computing device, cause the computing device to operate by: sensing a position or orientation or both of a mobile device, wherein the sensing is other than a radio-based search; determining a beam position of a wireless radio transmission beam and from a remote transmitter base and toward the mobile device by using the sensed position or orientation or both of the mobile device and without performing a radio-based search; and wirelessly transmitting data between the transmitter base and the mobile device along the beam position to perform functions at the mobile device or the transmitting base or both using the transmitted data.

By another approach, the instructions cause the computing device to be operated by wherein the mobile device is a display device to display images of a video sequence, wherein the transmitted data forms images having a perspective determined by using sensor data from the sensing of the position of the mobile device, and wherein a wireless network forming the transmissions has a frequency band and bandwidth sufficient to provide video images on the display device and perceived to be in near real-time without substantial delay noticeable to a user and while the display device is moving, wherein the instructions cause the computing device to operate by: moving the HMD to at least one HMD position or orientation or both from a prior HMD position or orientation or both; determining the change in HMD position or orientation or both; and determining an updated beam position associated with the moving of the HMD comprising using a measure of the change in HMD position or orientation or both.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of image processing, comprising:
    during an initialization stage:
        performing, by a base, both a radio-based search and sensing that is other than a radio-based search to determine a 3D start mobile device (MD) position of a remote MD relative to the base; and
    during a run-time stage after the initialization stage:
        performing from the base sensing that is other than a radio-based search without any radio-based search during the run-time stage to track motion of the MD to multiple 3D MD positions, and
        transmitting images from the base to the MD along wireless radio-based transmission beams positioned by using the multiple 3D MD positions.

2. The method of claim 1 wherein the initialization stage comprises performing the radio-based search to set multiple beam positions extending between the base and the mobile device (MD) at different positions,
    sensing, by the sensors, that is other than the radio-based search, at least the 3D start MD position of the MD, and
    determining a location of the 3D start MD position relative to the base using both the beam positions of the searching and the results of the sensing.

3. The method of claim 1 wherein the sensing comprises detecting light projected from the base and reflected back to the base from the MD.

4. The method of claim 1 wherein the MD is a head mounted display (HMD).

5. The method of claim 1 comprising transmitting sensor data from sensors on the MD and to the base to be used to compute, at the base, the 3D MD position and the beam position.

6. The method of claim 1 wherein the initialization stage comprises using the radio-based search to determine a beam position and the sensing to determine the MD position for at least two MD positions, and triangulating a position of the base relative to the one of the MD positions.

7. The method of claim 1 comprising generating the images with perspectives that correspond to the location and orientation of the MD by using sensor data also used to determine the 3D MD position.

8. A device comprising:
a base having at least one antenna, at least one sensor, and at least one processor to track motion of a remote mobile device (MD) and send images to the MD, the base being arranged to operate by:
during an initialization stage:
performing both a radio-based search and sensing that is other than a radio-based search to determine a 3D start mobile device position of the MD relative to the base; and
during a run-time stage after the initialization stage:
performing sensing that is other than a radio-based search without any radio-based search during the run-time stage to track motion of the MD to multiple 3D MD positions, and
transmitting images from the base to the MD along wireless radio-based transmission beams positioned by using the multiple 3D MD positions.

9. The device of claim 8 wherein the initialization stage comprises performing the radio-based search to set multiple beam positions extending between the base and the mobile device (MD) at different positions,
sensing by the sensors that is other than the radio-based search, at least the 3D start MD position of the MD, and
determining a location of the 3D start MD position relative to the base using both the beam positions of the searching and the results of the sensing.

10. The device of claim 8 wherein at least some sensors for locating the 3D MD position of the MD are on the MD.

11. The device of claim 8 wherein the base is arranged to operate by using at least one of the 3D MD positions to determine an aimed beam position aimed from the base and toward the MD; and the base having a receiver to receive sensor data along a beam at the aimed beam position.

12. The device of claim 8 wherein each additional MD position after the 3D start MD position and determined by sensors in the run-time stage is determined relative to the MD position before it to track the MD position relative to the base.

13. The device of claim 8 wherein each additional MD position after the 3D start MD position and determined by sensors in the run-time stage is determined directly relative to the 3D MD start position to track the MD position relative to the base.

14. The device of claim 8 wherein the base is arranged to operate by generating an incident angle comprising factoring (1) a position angle measuring a change in angle relative to the base from a prior MD position to a subsequent MD position, and (2) an orientation angle measuring the change in orientation of the MD in the prior MD position and in the subsequent MD position; and
directing a beam position along the incident angle.

15. A method of image processing comprising:
during an initialization stage:
computing, by a head mounted display (HMD), one or more beam positions, and
using the beam positions and results of both a radio-based search and sensing that is other than a radio-based search to determine a 3D start head mounted display position of the remote HMD relative to a base; and
during a run-time stage after the initialization stage:
performing from the HMD sensing that is other than a radio-based search without any radio-based search during the run-time stage to track motion of the HMD to multiple 3D HMD positions, and
transmitting images from the base to the HMD along wireless radio-based transmission beams positioned by using the multiple 3D HMD positions.

16. The method of claim 15 wherein the initialization stage comprises performing a radio-based search to set multiple beam positions extending between a base and a head mounted display (HMD) at different positions,
sensing, by sensors, that is other than the radio-based search at least a 3D start HMD position of the HMD, and
determining a location of the 3D start HMD position relative to the base using both the beam positions of the searching and the results of the sensing.

17. The method of claim 16 comprising moving the HMD to at least one subsequent current HMD position from the 3D start HMD position causing a change in HMD position;
determining the measure of the change in HMD position so that the current HMD position indicates a position relative to the base; and
determining an updated beam position directed to the current HMD position by using the measure of the change in HMD position.

18. The method of claim 15 comprising:
sensing a series of changes from prior HMD positions to multiple current HMD positions;
determining the HMD position of individual ones of the current HMD positions and directly relative to the 3D start HMD position to update the beam position to be directed to the individual current HMD positions to track the HMD position relative to the base.

19. The method of claim 15 comprising:
sensing a series of changes from prior HMD positions to multiple current HMD positions;
determining the HMD position of an individual one of the current HMD positions relative to a directly prior HMD position in the series and to update the beam position directed to the individual one current HMD position.

20. A device comprising:
a head mounted display (HMD) remote from a base and having at least one display, at least one antenna, sensors and at least one processor, the HMD being arranged to operate by:
during an initialization stage:
computing one or more beam positions, wherein the beam positions and results of both a radio-based search and sensing that is other than a radio-based search are used to determine a 3D start head mounted display (HMD) position of the HMD relative to the base; and
during a run-time stage after the initialization stage:
performing from the HMD sensing that is other than a radio-based search without any radio-based search during the run-time stage to track motion of the HMD to multiple 3D HMD positions, and
transmitting images from the base to the HMD along wireless radio-based transmission beams positioned by using the multiple 3D HMD positions.

21. The device of claim 20 wherein the beam position is established at the base.

22. The device of claim 20 wherein the HMD is arranged to operate by using at least one of the multiple 3D HMD positions to determine an aimed beam position aimed from the HMD and toward the base; and the head mounted display having a transmitter to transmit sensor data of the at least one sensor along a beam at the aimed beam position and to the base.

23. The device of claim 20 wherein the at least one processor is arranged to operate by generating an incident angle comprising factoring (1) a position angle measuring a change in angle relative to the base from a prior HMD position to a subsequent HMD position, and (2) an orientation angle measuring the change in orientation of the HMD in the prior HMD position and in the subsequent HMD position; and directing a beam position along the incident angle.

24. The device of claim 20 wherein the HMD is arranged to operate by determining the position of the HMD relative to the base for multiple HMD positions during the run-time stage.

25. The device of claim 24 wherein the HMD position is determined relative to the base for each HMD position during the run-time stage.

\* \* \* \* \*